US012747847B2

(12) United States Patent
Nara et al.

(10) Patent No.: US 12,747,847 B2
(45) Date of Patent: Sep. 29, 2026

(54) PLANAR ILLUMINATION DEVICE

(71) Applicant: MINEBEA MITSUMI Inc., Nagano (JP)

(72) Inventors: Yusuke Nara, Kitasaku-gun (JP); Takahito Yoshida, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 18/571,842

(22) PCT Filed: Mar. 18, 2022

(86) PCT No.: PCT/JP2022/012691
§ 371 (c)(1),
(2) Date: Dec. 19, 2023

(87) PCT Pub. No.: WO2023/276328
PCT Pub. Date: Jan. 5, 2023

(65) Prior Publication Data

US 2024/0360980 A1 Oct. 31, 2024

(30) Foreign Application Priority Data

Jun. 28, 2021 (JP) ................................ 2021-106666
Aug. 30, 2021 (JP) ................................ 2021-139887

(51) Int. Cl.

| | |
|---|---|
| ***F21V 7/00*** | (2006.01) |
| ***F21V 7/04*** | (2006.01) |
| *F21Y 105/16* | (2016.01) |

(52) U.S. Cl.
CPC .......... *F21V 7/0083* (2013.01); *F21V 7/0066* (2013.01); *F21V 7/048* (2013.01); *F21Y 2105/16* (2016.08)

(58) Field of Classification Search
CPC ...... F21V 7/0083; F21V 7/0066; F21V 7/048; F21Y 2105/16; F21Y 2105/18;
(Continued)

(56) References Cited

U.S. PATENT DOCUMENTS 6,923,557 B2 * 8/2005 Jahn ...................... F21V 21/005
362/249.14
7,517,105 B2 * 4/2009 Sakai ................ G02F 1/133603
362/23.11
(Continued)

FOREIGN PATENT DOCUMENTS

JP 2011-089121 A 5/2011
JP 2019-091036 A 6/2019
(Continued)

OTHER PUBLICATIONS

English translation of the Written Opinion for corresponding International Application No. PCT/JP2022/012691 mailed Apr. 26, 2022.
(Continued)

*Primary Examiner* — Fatima N Farokhrooz
(74) *Attorney, Agent, or Firm* — Chrisman Gallo Tochtrop LLC

(57) ABSTRACT

A planar illumination device of an embodiment includes a plurality of light sources, a substrate, and a reflector. The light sources are bidimensionally disposed on the substrate. The reflector is provided with a segment including a hole corresponding to each of the light sources and a reflecting surface extending obliquely from a periphery of the hole, is provided with outer walls at an entire outer peripheral portion of the reflector, and is disposed at an emission side of the substrate. In the segment disposed at an irregular portion of an outer peripheral portion of the reflector and unconfigurable into a predetermined shape by the outer walls, surfaces of the outer walls opposing the substrate are
(Continued)

provided with recessed portions for accommodating the light sources or adjusting the amount of light.

16 Claims, 28 Drawing Sheets

(58) Field of Classification Search
CPC .. G02B 19/0019; G02B 5/09; G02B 19/0066; G02F 1/133602; G02F 1/133611; G02F 1/133605; G02F 1/133606; G02F 1/133603
See application file for complete search history.

(56) References Cited

U.S. PATENT DOCUMENTS

| | | | | |
|---|---|---|---|---|
| 7,828,456 | B2 * | 11/2010 | Boyer | F21V 7/18 362/153.1 |
| 8,652,357 | B2 | 2/2014 | Ryu et al. | |
| 8,773,012 | B2 | 7/2014 | Ryu et al. | |
| 10,698,259 | B2 | 6/2020 | Son et al. | |
| 10,948,775 | B2 | 3/2021 | Hashimoto et al. | |
| 11,372,286 | B2 | 6/2022 | Hashimoto et al. | |
| 11,754,879 | B2 | 9/2023 | Hashimoto et al. | |
| 2006/0092619 | A1 * | 5/2006 | Hsu | H01H 13/83 362/582 |
| 2007/0159849 | A1 * | 7/2007 | Sakai | G02F 1/133605 362/612 |
| 2008/0047181 | A1 * | 2/2008 | Sakai | G09F 13/04 40/546 |
| 2011/0096560 | A1 | 4/2011 | Ryu et al. | |
| 2013/0010476 | A1 * | 1/2013 | Pickard | F21V 17/10 362/311.03 |
| 2013/0021823 | A1 * | 1/2013 | Yamagami | F21S 8/06 362/613 |
| 2013/0134937 | A1 * | 5/2013 | Umeda | H02J 7/00 320/109 |
| 2014/0133146 | A1 | 5/2014 | Ryu et al. | |
| 2018/0010754 | A1 * | 1/2018 | Albou | H01L 33/06 |
| 2019/0146278 | A1 | 5/2019 | Son et al. | |
| 2020/0285117 | A1 * | 9/2020 | Hashimoto | G02F 1/133608 |
| 2021/0165281 | A1 | 6/2021 | Hashimoto et al. | |
| 2022/0269137 | A1 | 8/2022 | Hashimoto et al. | |
| 2022/0308272 | A1 * | 9/2022 | Hashimoto | G02F 1/133605 |
| 2023/0367153 | A1 | 11/2023 | Hashimoto et al. | |
| 2024/0231146 | A1 * | 7/2024 | Momoi | F21V 5/00 |

FOREIGN PATENT DOCUMENTS

| | | | | |
|---|---|---|---|---|
| JP | 2021-012884 A | 2/2021 | | |
| WO | WO-2009098797 A1 * | 8/2009 | | G09F 9/35 |

OTHER PUBLICATIONS

International Search Report for corresponding International Application No. PCT/JP2022/012691 mailed Apr. 26, 2022.
Written Opinion for corresponding International Application No. PCT/JP2022/012691 dated Apr. 26, 2022.

* cited by examiner

PLANAR ILLUMINATION DEVICE

CROSS-REFERENCE TO RELATED APPLICATIONS

This application is a national stage entry of International Application No. PCT/JP2022/012691, filed on Mar. 18, 2022, which claims priority to Japanese Patent Application Numbers 2021-106666 and 2021-139887, filed on Jun. 28, 2021 and Aug. 30, 2021, respectively, which are incorporated herein by reference.

TECHNICAL FIELD

The disclosure relates to a planar illumination device.

BACKGROUND

A direct-type planar illumination device with light sources such as light emitting diodes (LEDs) bidimensionally disposed on a substrate often uses a reflector to reflect light emitted from the light sources in a direction oblique to a normal direction of the substrate and increase light in the normal direction of an emission surface (see, for example, JP 2021-12884 A).

The reflector has a unit structure called a segment provided for an individual light source, and each segment includes a hole and a reflecting surface extending obliquely from the periphery of the hole and surrounding the light source. A head (light-emitting portion) of the individual light source is inserted into the hole. The segment is often formed in a regular shape such as a rectangle or a hexagon in a plan view.

SUMMARY

However, for a planar illumination device having an irregular outer shape such as a non-rectangular outer shape, a segment having a predetermined shape (standard segment) cannot be formed at an outer peripheral portion of an irregular portion, thus the segment is not arrangeable, and an incomplete region may be left. In this case, a small region where no light source is arrangeable can be ignored, but when an outer wall provided at an outer peripheral portion of the reflector for providing strength or the like becomes an obstacle to cause a light source to not be arrangeable, the remaining region has an unignorable size. As a result, the luminance of the outer peripheral portion of the irregular portion decreases to form a dark portion.

In light of the foregoing, the disclosure is directed at providing a planar illumination device even when the planar illumination device has an irregular outer shape. The planar illumination device allows a dark portion to be less likely to be formed.

To solve the problem described above and achieve the object, a planar illumination device according to an aspect of the disclosure includes a plurality of light sources, a substrate, and a reflector. The light sources are bidimensionally disposed on the substrate. The reflector is provided with a segment including a hole corresponding to each of the light sources and a reflecting surface extending obliquely from a periphery of the hole, is provided with outer walls at an entire outer peripheral portion of the reflector, and is disposed at an emission side of the substrate. In the segment disposed at an irregular portion of an outer peripheral portion of the reflector and unconfigurable into a predetermined shape by the outer walls, surfaces of the outer walls opposing the substrate are provided with recessed portions for accommodating the light sources or adjusting an amount of light.

A planar illumination device according to an aspect of the disclosure allows a dark portion to be less likely to be formed even when the planar illumination device has an irregular outer shape.

DESCRIPTION OF EMBODIMENTS

Figure 1:
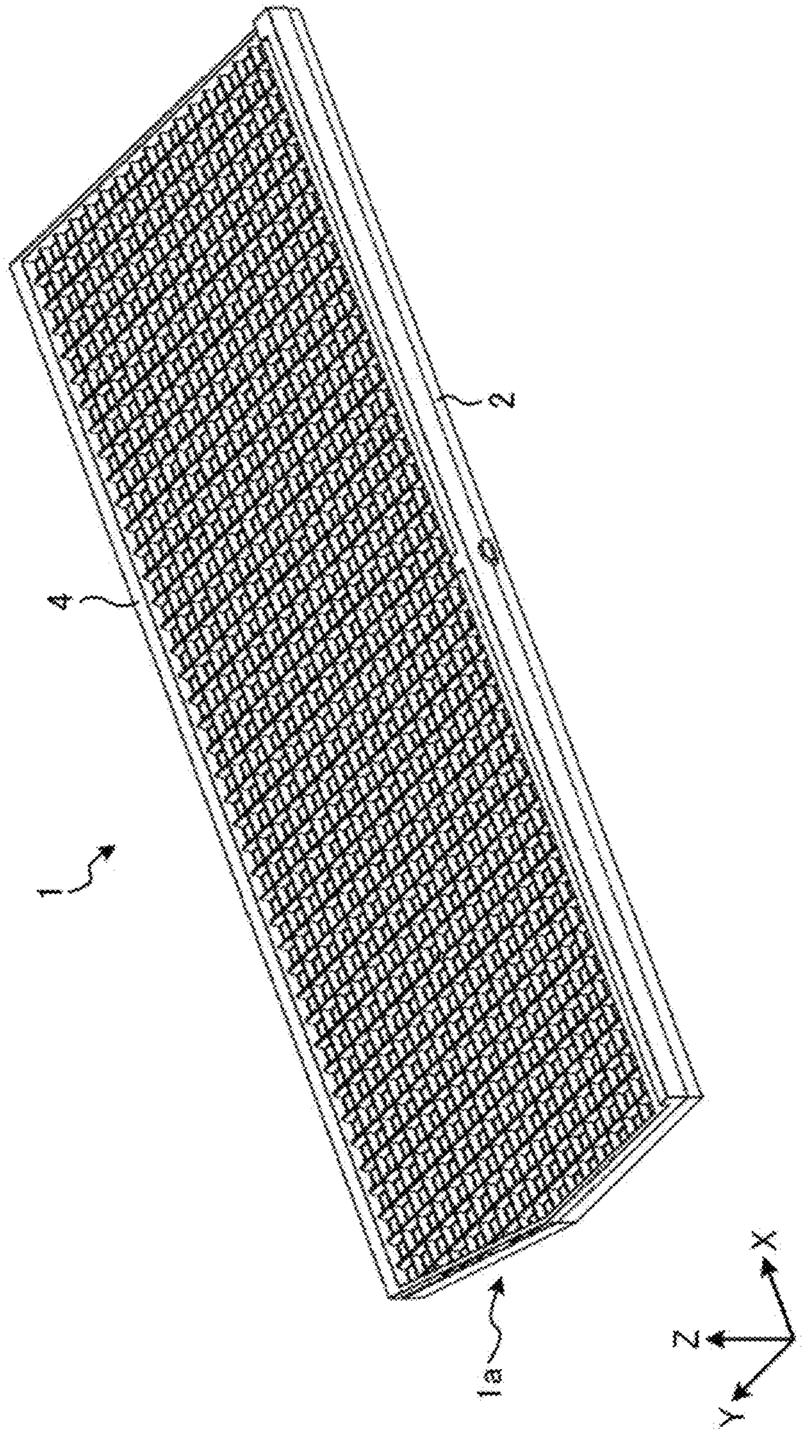
FIG. 1 is a perspective view of a planar illumination device according to a first embodiment.

A planar illumination device according to embodiments is described below with reference to the drawings. Further, the disclosure is not limited to the embodiment. Furthermore, the dimensional relationships between elements, proportions of the elements, and the like in the drawings may differ from reality. The drawings may include parts having mutually different dimensional relationships and proportions. Furthermore, the contents described in one embodiment or modified examples are applied in principle to other embodiments or modification examples.

First Embodiment

FIG. 1 is a perspective view of a planar illumination device 1 according to a first embodiment. For the sake of convenience, a longitudinal direction of the planar illumination device 1 is an X-axis direction, a lateral direction is a Y-axis direction, and a thickness direction is a Z-axis direction, but an orientation during use is arbitrary.

In FIG. 1, the planar illumination device 1 includes a substrate 2 and a reflector 4 fixed to an upper side of the substrate 2 in the drawing by a double-sided tape or the like. A cutout portion 1*a* is provided at the left side of the substrate 2 and the reflector 4 in the drawing to form an irregular outer shape. The irregular outer shape may not only be chipped in a linear shape like the cutout portion 1*a* but also be chipped in an arc shape or in a complicated shape.

Figure 2:
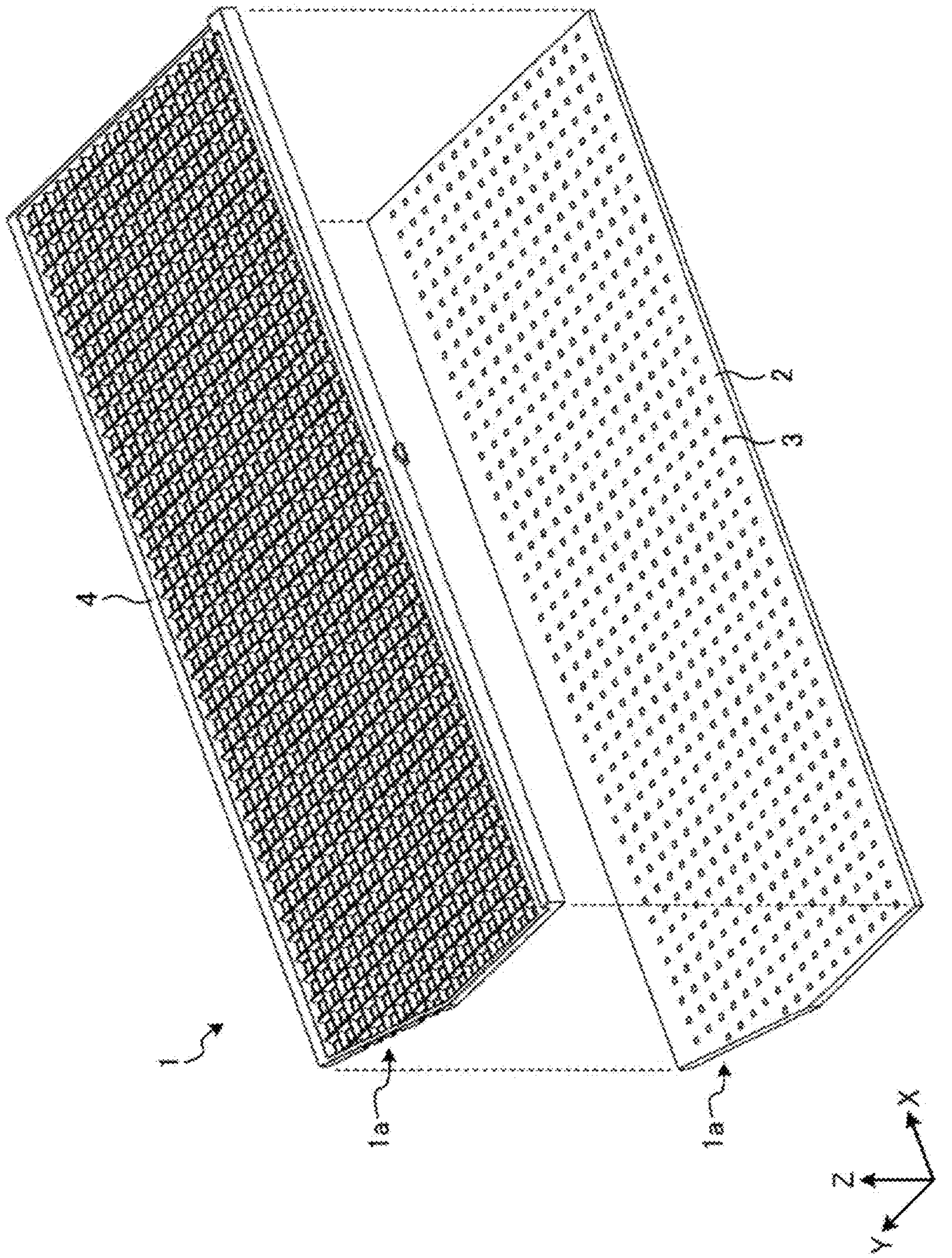
FIG. 2 is an exploded perspective view of the planar illumination device.

FIG. 2 is an exploded perspective view of the planar illumination device 1. In FIG. 2, light sources 3 such as light-emitting diodes (LEDs) are bidimensionally disposed on the substrate 2, and wiring (not illustrated) to each light source 3 is also provided. Although the substrate 2 and the reflector 4 each have a flat plate shape in the illustrated example, the substrate 2 and the reflector 4 may be curved such as a convex curved surface or a recessed curved surface. In this case, the "bidimensionally disposed" means being disposed on a curved surface, for example, being disposed at a position represented by two independent coordinate axes on a curved surface by cylindrical coordinates, spherical coordinates, or the like. The light source 3 has an optical axis in the normal direction of the substrate 2. A portion of the substrate 2 not covered with the reflector 4 (portion exposed through a hole 4*b* to be described below) or the entire surface of the substrate 2 is subjected to a treatment for increasing the reflectance of light.

In an actual product, a lens array, a diffuser, and various optical sheets are disposed at an upper side (emission side) of the reflector 4 in the drawing, and the lens array, the diffuser, and the optical sheets are often housed in a frame (provided with an opening at the emission side) made of metal, resin, or the like. Examples of the optical sheet include a prism sheet (prism film), a luminance enhancement sheet (luminance enhancement film), and a louver sheet (louver film).

Figure 3:
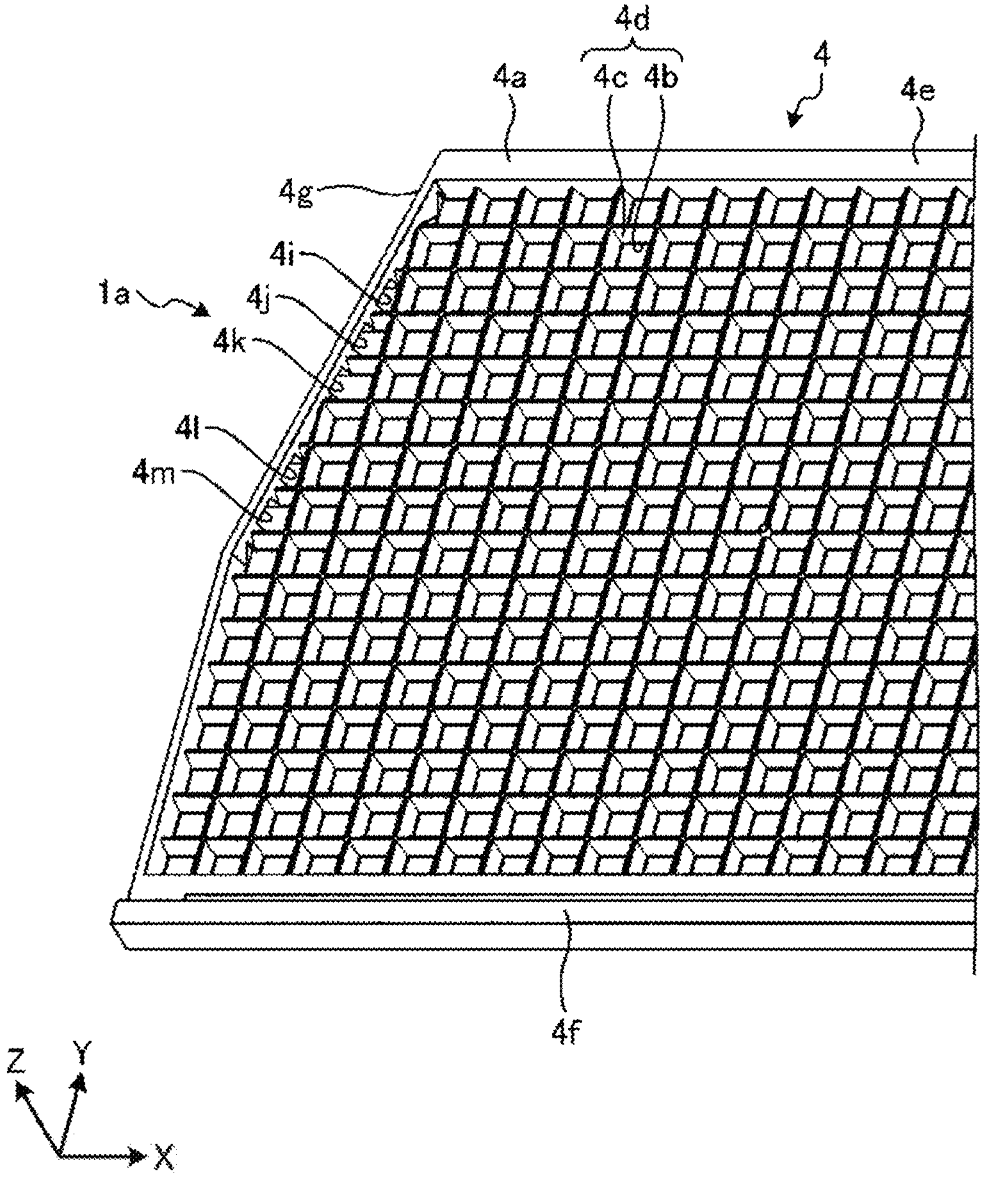
FIG. 3 is an enlarged perspective view of the vicinity of a cutout portion of a reflector.
Figure 4:
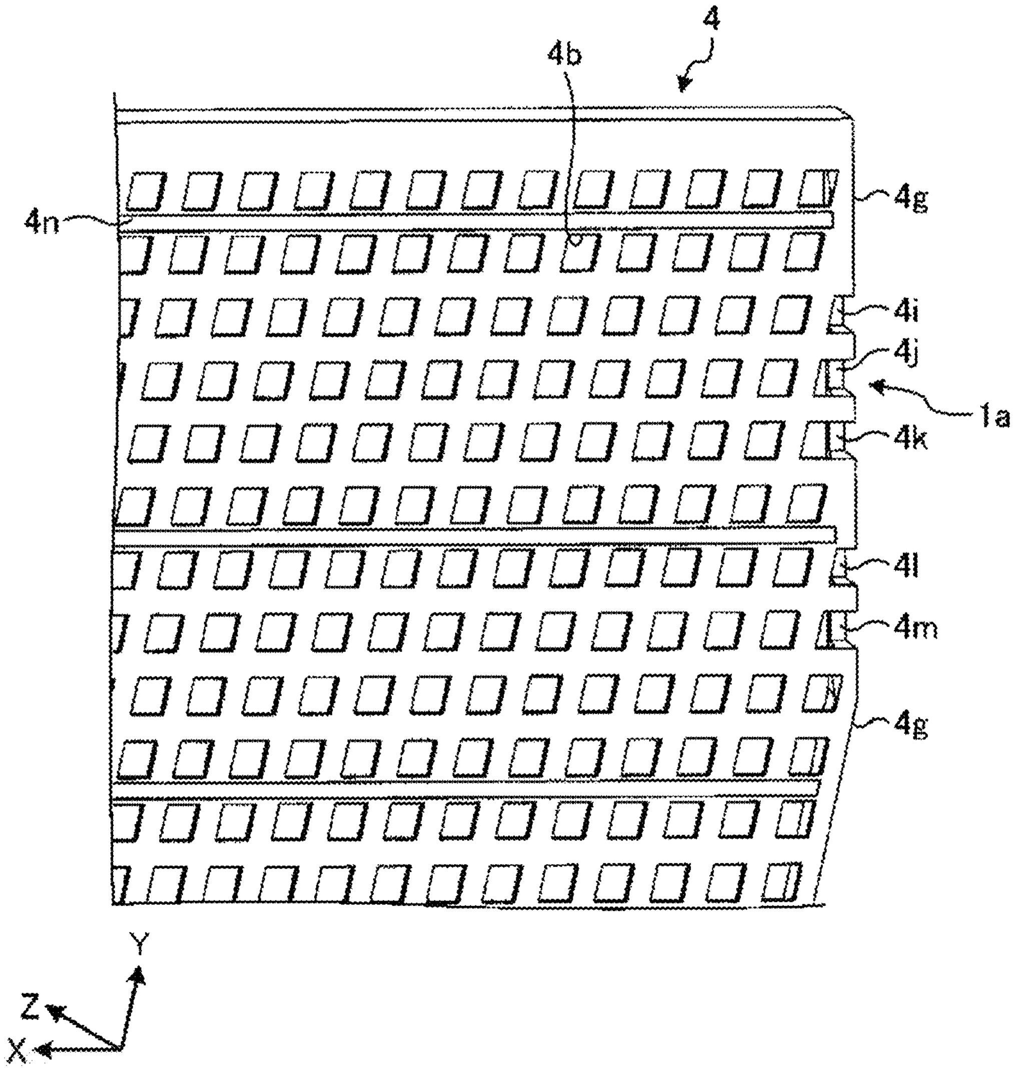
FIG. 4 is an enlarged perspective view of the vicinity of the cutout portion of the reflector viewed from another viewpoint.
Figure 5:
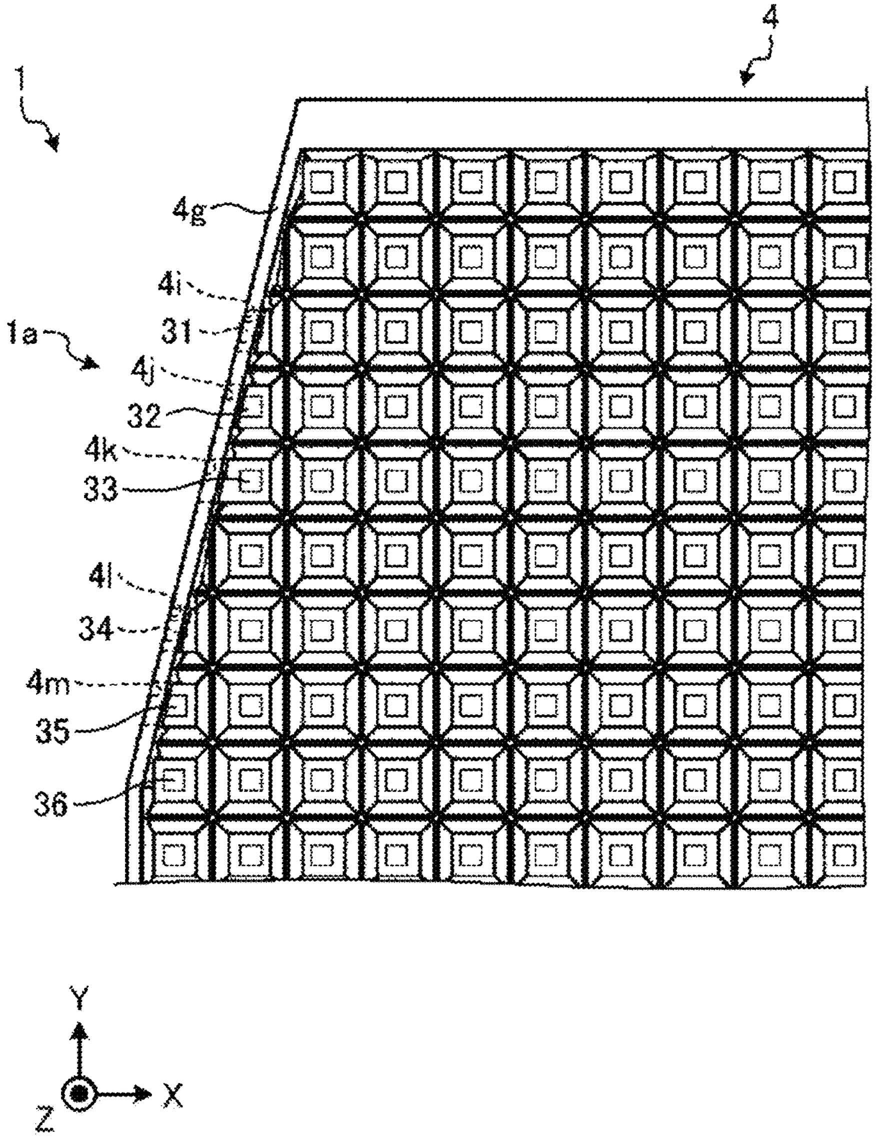
FIG. 5 is a view from a direction facing an emission surface in the vicinity of the cutout portion of the planar illumination device.

FIG. 3 is an enlarged perspective view of the vicinity of the cutout portion 1*a* of the reflector 4. FIG. 4 is an enlarged perspective view of the vicinity of the cutout portion 1*a* of the reflector 4 viewed from another viewpoint. FIG. 5 is a view from a direction facing an emission surface in the vicinity of the cutout portion of the planar illumination device 1.

In FIGS. 3 to 5, the reflector 4 has outer walls 4*e*, 4*f*, 4*g*, and 4*h* (the outer wall 4*h* is not illustrated) serving as outer peripheral portions. In FIG. 4, a recessed portion 4*n* is a portion disposed with a double-sided tape for attaching the reflector 4 to the substrate 2.

In FIGS. 3 to 5, the reflector 4 has a segment 4*d* provided corresponding to each light source 3 (FIG. 2). The segment 4*d* has a hole 4*b*, and a reflecting surface 4*b* extending obliquely from the periphery of the hole 4*b* and surrounding the light source 3, a head of the light source 3 being inserted into the hole 4*b*. In the illustrated example, the segment 4*d* is formed in a rectangular shape, and the reflecting surface 4*c* is divided into four. That is, the light source 3 has a substantially rectangular outer shape in a plan view, a predetermined shape of the segment is substantially rectangular in the plan view, the hole 4*b* in the predetermined shape of the segment has a substantially rectangular outer shape in a plan view, and the reflecting surface 4*c* in the predetermined shape of the segment is constituted by four planes. Part or all of the reflecting surfaces may be constituted by two or more surfaces. For example, when each of all the reflecting surfaces is constituted by two surfaces, the total number of surfaces is 8.

In the cutout portion 1*a* having the irregular outer shape, for a column of the segments extending in a vertical direction at the left end of FIG. 3, no segments are disposed in six rows from the upper side of the drawing, and segments are disposed in two rows below the six rows although the segments do not have a regular predetermined shape. In these segments, recessed portions 4*l* and 4*m* for accommodating the light sources 3 are provided at the surface of the outer wall 4*g* of the reflector 4 opposing the substrate 2 (back surface in FIG. 3). The recessed portions 4*l* and 4*m* are provided through the outer wall 4*g* can be provided with adequate widths sufficient to accommodate light sources 34 and 35 (FIG. 5) even when the outer wall 4*g* is not thick enough.

For the second column from the left end of FIG. 3, no segments are disposed in two rows from the upper side of the drawing, and segments are disposed in three rows below the two rows although the segments do not have a regular predetermined shape. In the segments, recessed portions 4*i*, 4*j*, and 4*k* are provided at the surface of the outer wall 4*g* of the reflector 4 opposing the substrate 2 (back surface in FIG. 3). Among the three recessed portions 4*i*, 4*j*, and 4*k*, two recessed portions 4*i* and 4*j* are provided to accommodate light sources 31 and 32 (FIG. 5). The remaining recessed portion 4*k* is provided to adjust the amount of light.

That is, in the segment provided with the recessed portion 4*k*, the outer wall 4*g* does not interfere with the arrangement of a light source 33 (FIG. 5), but the area of the segment is reduced, the segment as it is has an increased amount of light per area to be brighter, and thus part of the light is consumed by the recessed portion 4*k* to adjust the amount of light. In this regard, although a segment of a light source 36 (FIG. 5) does not have a regular predetermined shape, the area of the segment is less reduced, and the amount of light per area is less affected, thus providing no recessed portion.

Although the reflector 4 is made of, for example, a white resin or the like having a high reflectance, the material of the recessed portions 4*i* to 4*m* may be exposed or the reflectance may be changed by coloring or the like.

In this way, as for a portion where the light source 3 is not arrangeable due to an interference of the outer wall 4*g* even in an irregular portion where a segment (standard segment) 4*d* having a predetermined outer shape is not arrangeable due to the irregular outer shape of the cutout portion 1*a*, the recessed portions 4*i*, 4*j*, 4*l*, and 4*m* are provided at the surface of the outer wall 4*g* opposing the substrate 2, thus allowing the light sources 31, 32, 34, and 35 to be disposed to arrange segments. This can eliminate a decrease in the luminance of the outer peripheral portion of an irregular portion and prevent a dark portion from being formed.

Eliminating the outer wall 4*i* is conceivable instead of providing the recessed portions 4*i*, 4*j*, 4*l*, 4*m*, and the like, but the strength of the reflector 4 is decreased, and light from the light sources 31, 32, 34, 35, and the like is too strong and rather impairs the uniformity of luminance. That is, the recessed portions 4*i*, 4*j*, 4*l*, and 4*m* blocking light emitted directly above the light sources 31, 32, 34, and 35 can reduce the light emission efficiency per area can and improve the uniformity in a light emission surface.

As in the segment of the light source 33, the outer wall 4*g* does not interfere with the arrangement of the light sources 33, but the recessed portion 4*k* as described above is used to adjust the amount of light per area.

To compensate for a shortage of the amount of light due to an incomplete region where no segment is arrangeable, such as a region on the segment of the light source 34 in the drawing, the recessed portion 4*l* in the segment of the light source 34 can be enlarged to the upper side of the drawing. In this case, light is guided from the light source 34 to the incomplete region where no segment is arrangeable, allowing for compensating for a shortage of the amount of light.

Figure 6:
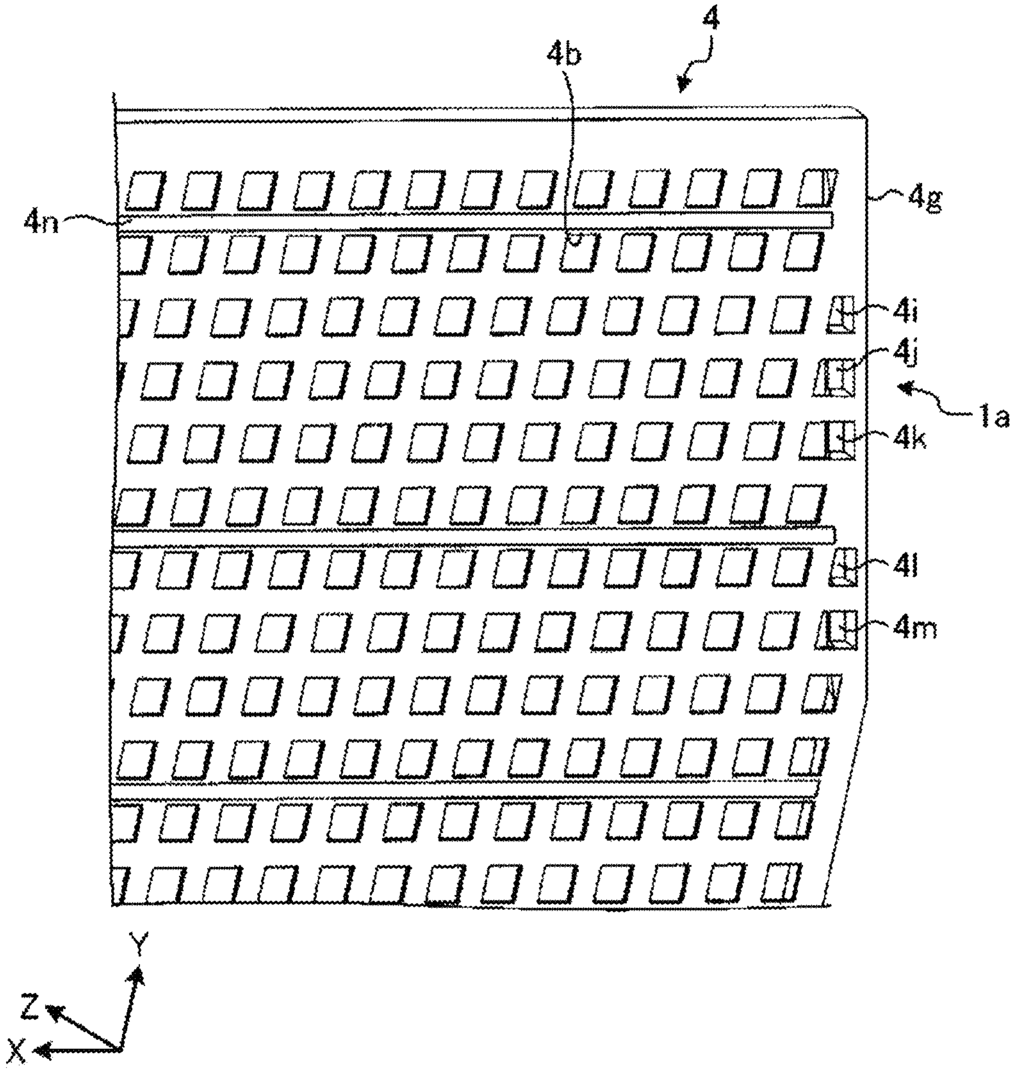
FIG. 6 is a perspective view illustrating an example provided with recessed portions without extending through an outer wall of the reflector.

FIG. 6 is a perspective view illustrating an example provided with the recessed portions 4*i* to 4*m* without extending through the outer wall 4*g* of the reflector 4. FIG. 6 is a view from the same viewpoint as in FIG. 4. In FIG. 6, the outer wall 4*g* of the reflector 4 is formed thicker, and the recessed portions 4*i*, 4*j*, 4*k*, 4*l*, and 4*m* do not extend through the outer wall 4*g*.

The recessed portions 4*i*, 4*j*, 4*k*, 4*l*, and 4*m* not extending through the outer wall 4*g* allows the thickness of the outer wall 4*g* to be maintained and the reduction of the strength of the reflector 4 to be prevented. Other effects are the same as the effects of the configuration example described above. A space for disposing light sources is provided above the recessed portion 4*i* in the drawing or above the recessed portion 4*l* in the drawing, and segments and recessed portions may be provided at the portion. In this case, the recessed portions may extend through the outer wall 4*g* as illustrated in FIG. 4 when the thickness of the outer wall 4*g* is insufficient.

In the examples of FIGS. 1 to 6, the reflector 4 is disposed on the substrate 2 so that the surface (grating surface) on a non-emission side contacts the substrate 2, but only the outer walls 4*e* to 4*h* of the reflector 4 or part of the outer walls 4*e* to 4*h* contact the substrate 2, and the hole 4*b* of the segment 4*d* may be made to be floating from the substrate 2. In this case, the head of the light source 3 disposed on the substrate 2 may or may not be inserted into the hole 4*b* of the segment 4*d*. When the head of the light source 3 is not inserted into the hole 4*b* of the segment 4*d*, the reflector 4 and the light source 3 are prevented from interfering with each other even though the reflector 4 and the light source 3 expand or contract due to a temperature change. When the head of the light source 3 is not inserted into the hole 4*b* of the segment 4*d*, the size of the hole 4*b* of the segment 4*d* in a plan view may be larger than the light-emitting portion of the light source 3 (for example, a light-emitting portion having a rectangular shape is provided inside the rectangular outer shape of the light source 3) or may be smaller than the outer shape of the light source 3. In this case, even though the light sources 3 are disposed at a small pitch and the segments 4*d* of the reflector 4 are disposed at a high density, the reflector 4 can be easily manufactured by injection molding or the like, a height of a wall constituting the reflecting surface 4*c* of the segment 4*d* can be increased (the thickness in the Z-axis direction can be increased), reflection efficiency is improved, and emission of light to adjacent segments 4*d* is suppressed to improve contrast during local dimming. Such a structure of the reflector 4 can also be similarly applied to the following embodiments.

Second Embodiment

Figure 7:
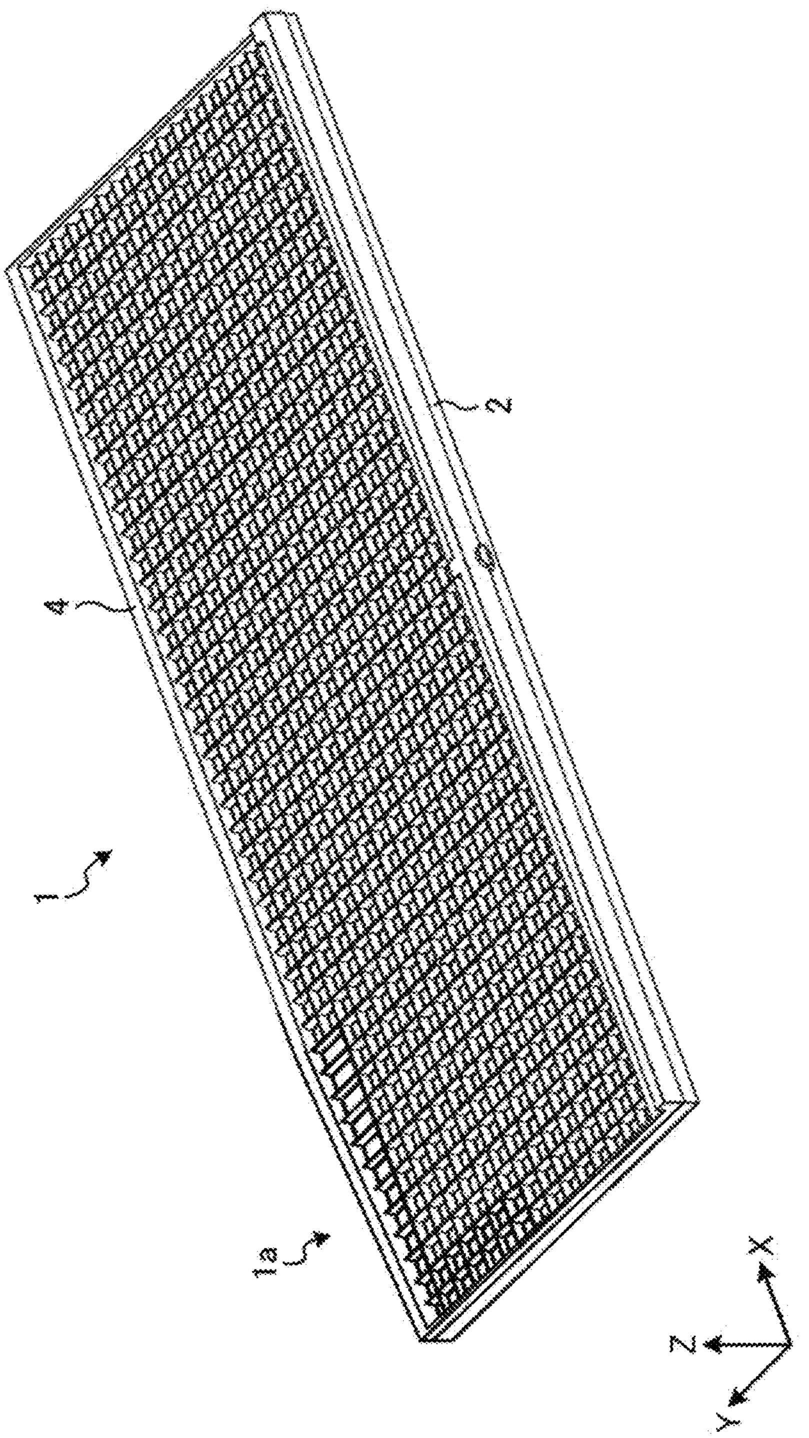
FIG. 7 is a perspective view of a planar illumination device according to a second embodiment.

FIG. 7 is a perspective view of a planar illumination device 1 according to a second embodiment. For the sake of convenience, a longitudinal direction of the planar illumination device 1 is an X-axis direction, a lateral direction is a Y-axis direction, and a thickness direction is a Z-axis direction, but an orientation during use is arbitrary.

In FIG. 7, the planar illumination device 1 includes a substrate 2 and a reflector 4 fixed to an upper side of the substrate 2 in the drawing by a double-sided tape or the like. In FIG. 7, light sources 3 on the substrate 2 are not illustrated. A cutout portion 1*a* is provided at the upper left side of the substrate 2 and the reflector 4 in the drawing to form an irregular outer shape. The irregular outer shape may not only be chipped in a linear shape like the cutout portion 1*a* but also be chipped in an arc shape or in a complicated shape.

Figure 8:
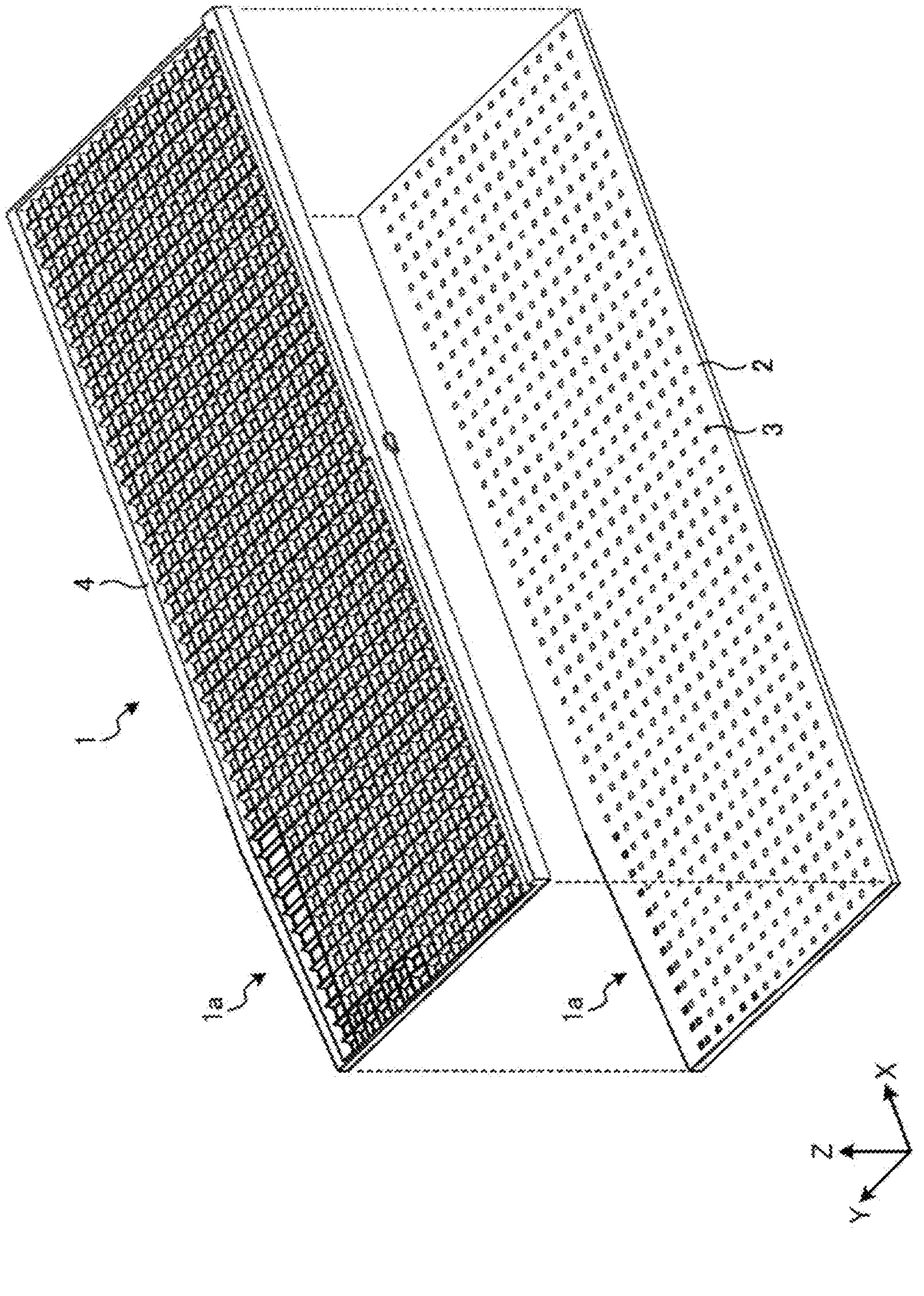
FIG. 8 is an exploded perspective view of the planar illumination device.

FIG. 8 is an exploded perspective view of the planar illumination device 1. In FIG. 8, the light sources 3 such as light-emitting diodes (LEDs) are bidimensionally disposed on the substrate 2, and wiring (not illustrated) to each light source 3 is also provided. Although the substrate 2 and the reflector 4 each have a flat plate shape in the illustrated example, the substrate 2 and the reflector 4 may be curved such as a convex curved surface or a recessed curved surface. In this case, the "bidimensionally disposed" means being disposed on a curved surface, for example, being disposed at a position represented by two independent coordinate axes on a curved surface by cylindrical coordinates, spherical coordinates, or the like. The light source 3 has an optical axis in the normal direction of the substrate 2. A portion of the substrate 2 not covered with the reflector 4 (portion exposed through a hole 4*b* to be described below) or the entire surface of the substrate 2 is subjected to a treatment for increasing the reflectance of light.

In an actual product, a lens array, a diffuser, and various optical sheets are disposed at an upper side (emission side) of the reflector 4 in the drawing, and the entire product is often housed in a frame (provided with an opening at the emission side) made of metal, resin, or the like. Examples of the optical sheet include a prism sheet (prism film), a luminance enhancement sheet (luminance enhancement film), and a louver sheet (louver film).

Figure 9:
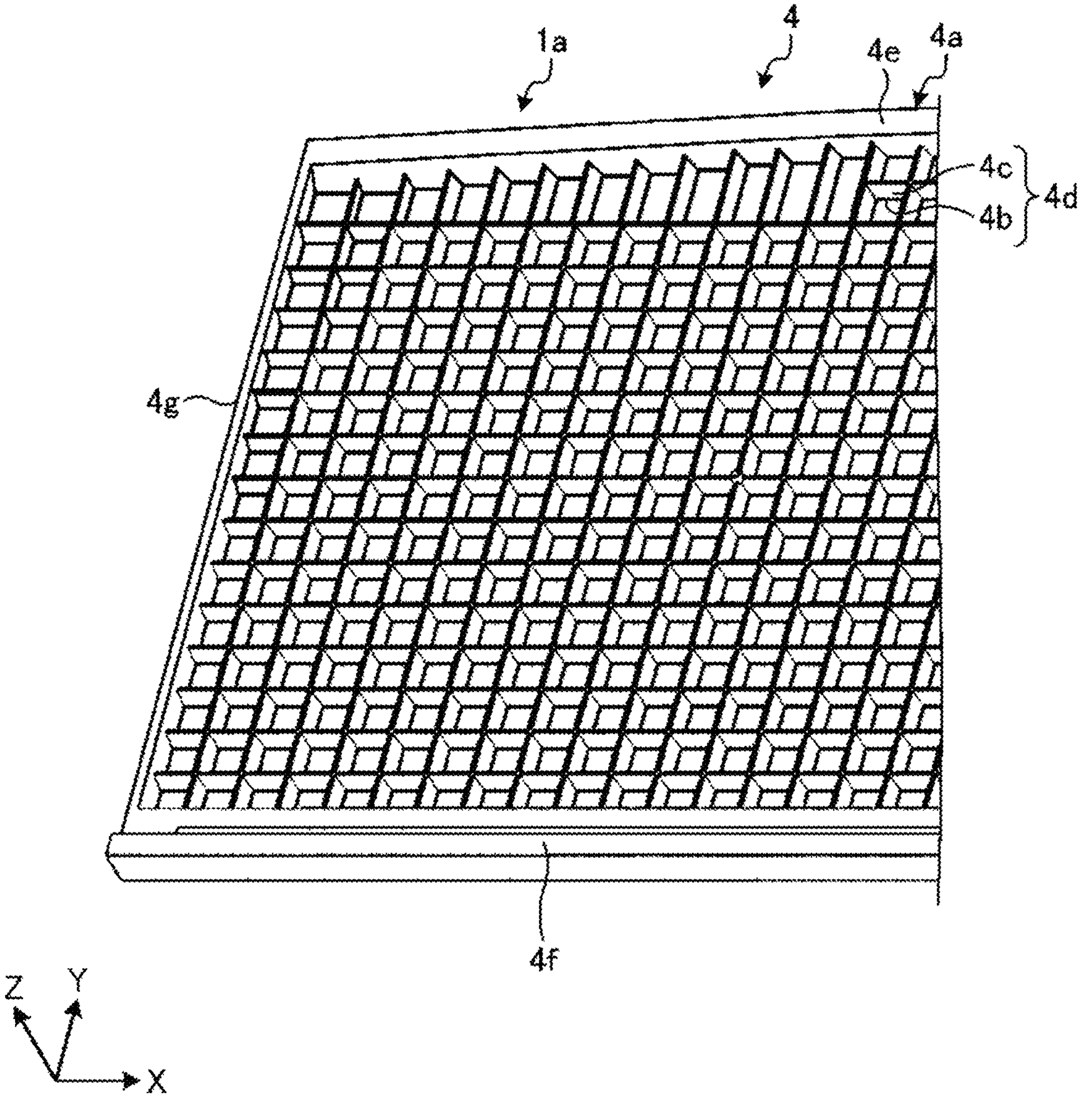
FIG. 9 is an enlarged perspective view of the vicinity of a cutout portion of a reflector.
Figure 10A:
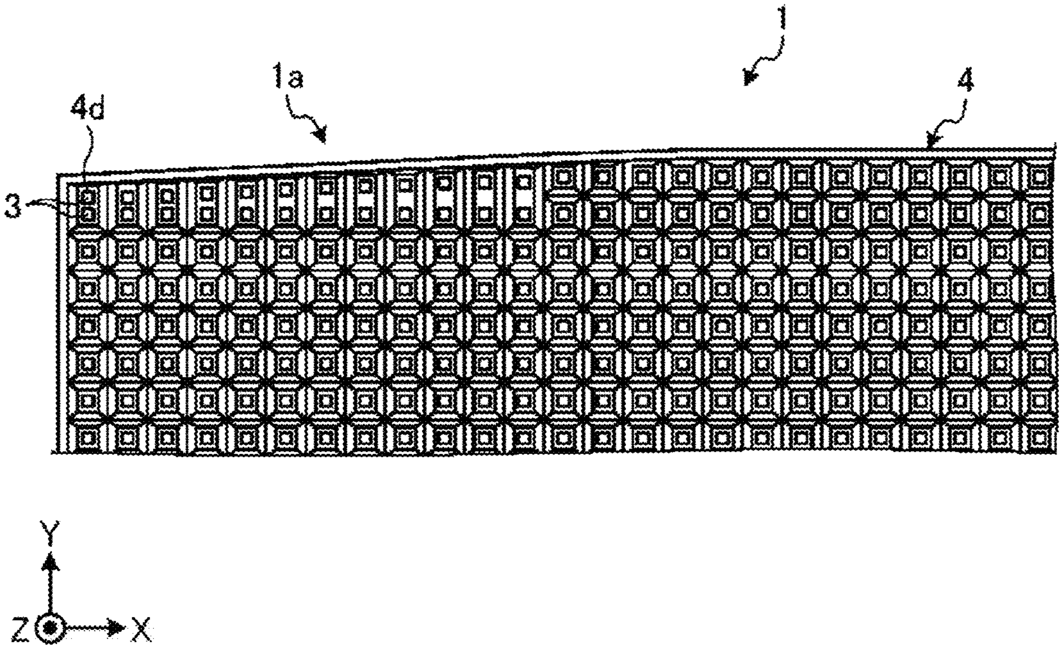
FIG. 10A is a plan view illustrating the vicinity of the cutout portion of the planar illumination device.

FIG. 9 is an enlarged perspective view of the vicinity of the cutout portion 1$a$ of the reflector 4. FIG. 10A is a plan view illustrating the vicinity of the cutout portion 1$a$ of the planar illumination device 1.

In FIGS. 9 and 10A, the reflector 4 has outer walls 4$e$, 4$f$, 4$g$, and 4$h$ (the outer wall 4$h$ is not illustrated) serving as outer peripheral portions. The reflector 4 has a segment 4$d$ provided corresponding to each light source 3. The segment 4$d$ has a hole 4$b$, and a reflecting surface 4$b$ extending obliquely from the periphery of the hole 4$b$ and surrounding the light source 3, a head of the light source 3 being inserted into the hole 4$b$. The outer walls 4$e$, 4$f$, 4$g$, and 4$h$ need not to be provided over the entire circumference of an entire outer peripheral portion, may be partially provided, or may not be provided anywhere.

In the illustrated example, the segment 4$d$ is formed in a rectangular shape, and the reflecting surface 4$c$ is divided into four. The light source 3 has a substantially cubic outer shape. That is, the light source 3 has a substantially rectangular outer shape in the plan view, the standard shape of the segment excluding an irregular portion is a substantially rectangular shape in a plan view, the hole 4$b$ of the segment has a substantially rectangular outer shape in the plan view, and the reflecting surface 4$c$ of the segment is constituted by four planes. Part or all of the reflecting surfaces may be constituted by two or more surfaces. For example, when each of all the reflecting surfaces is constituted by two surfaces, the total number of surfaces is 8. Hereinafter, the segment having the standard shape excluding the irregular portion is also referred to as a standard segment. In the present embodiment, a plurality of standard segments 4$d$ is lined in a regular manner (in a grid pattern) in row and column directions.

Figure 10B:
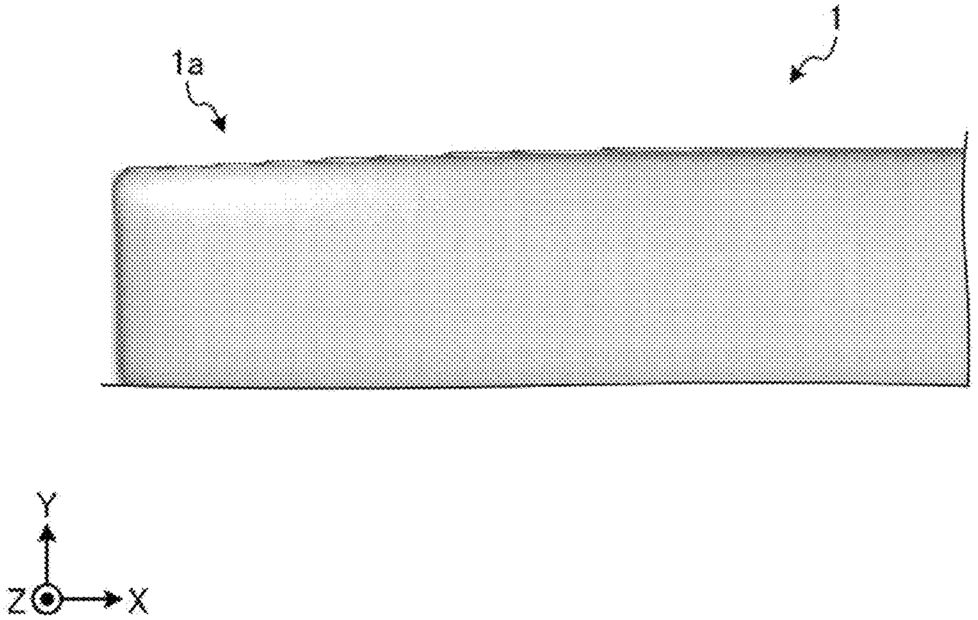
FIG. 10B is a view illustrating an example of a luminance distribution of the planar illumination device in FIG. 10A.

In the cutout portion 1$a$ having an irregular outer shape, a segment group for improving uniformity is disposed instead of the standard segment. That is, in 12 columns from the upper left end of the first row to the right side in the drawing, segments disposed in two rows with no irregular shape are integrated by removing a partition wall between the two rows. In other words, the segment 4$d$ having an irregular shape and a segment 4$d$ adjacent to the segment 4$d$ (not necessarily the standard segment 4$d$) are integrated by removing a partition wall (reflecting surface 4$c$) forming the boundary between the two segments 4$d$. The segment 4$d$ having an irregular shape is a (virtual) segment having a the hole 4$b$ smaller than the hole of the standard segment 4$d$ with at least one side of the hole 4$b$ along the outer shape of the whole (irregular portion). A plurality of (two) light sources 3 or a larger number of light sources 3 than the number of light sources 3 accommodated in the standard segment 4$d$ is accommodated in the hole 4$b$ of each segment 4$d$. In the holes 4$b$ of the segments 4$d$, the light sources 3 are vertically spaced apart from each other. Depending on the shape and size of the segment 4$d$ having an irregular shape, a space with the partition wall (reflecting surface 4$c$) can also be utilized as a space for accommodating the light sources 3. The other segments 4$d$ are disposed so that light emission centers of the light sources 3 are located at the centers. The light emission center corresponds to a position of a minute light-emitting chip incorporated in the light source 3, and does not necessarily coincide with the center of the package of the light sources 3. When a plurality of light-emitting chips is mounted, an average position of the light-emitting chips serves as a light emission center. FIG. 10B is a view illustrating an example of a luminance distribution of the planar illumination device 1 in FIG. 10A. The characteristics of the planar illumination device 1 are described below. Even though the arrangement positions of the light sources 3 are changed depending on the size or the like of the segment 4$d$ having an irregular shape to be integrated, the number of light sources 3 to be accommodated may not exceed the number of light sources 3 to be accommodated in the standard segment 4$d$. Three or more segments 4$d$ may be integrated or may not be integrated with an adjacent segment 4$d$ depending on the size or the like of the segment 4$d$ having an irregular shape.

Figure 11A:
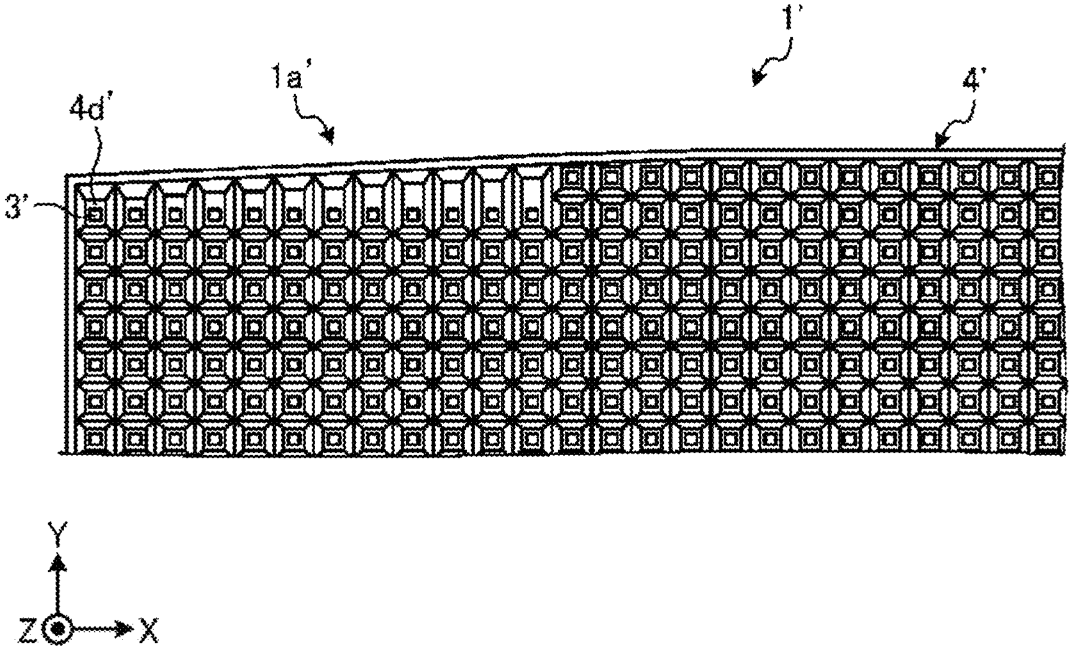
FIG. 11A is a plan view illustrating the vicinity of a cutout portion of a planar illumination device in a comparative example (modified example).
Figure 11B:
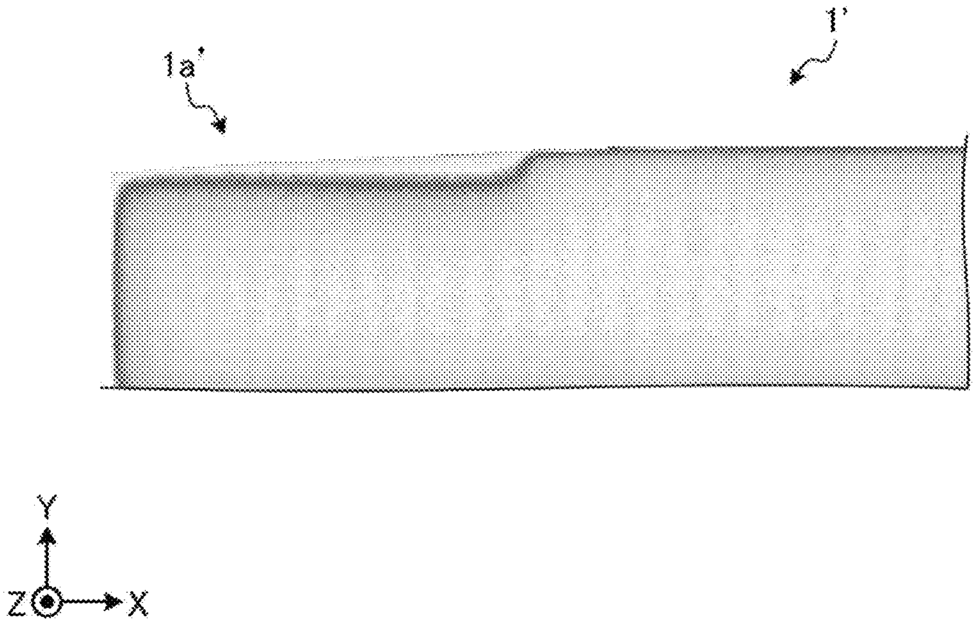
FIG. 11B is a view illustrating an example of a luminance distribution of the planar illumination device in FIG. 11A.

On the other hand, FIG. 11A is a plan view illustrating the vicinity of a cutout portion 1$a$' of a planar illumination device 1' in a comparative example (modified example). The cutout portion 1$a$' in the planar illumination device 1' in the comparative example of FIG. 11A is similar to that in FIG. 10A in that for twelve columns from the upper left end of the first row to the right side, two rows of segments with no irregular shape are integrated by removing a partition wall between the two rows. However, in the comparative example of FIG. 11A, one light source 3' is disposed at the position of the original second row in a hole of each segment 4$d$' of an irregular portion. FIG. 11B is a view illustrating an example of a luminance distribution of the planar illumination device 1' in FIG. 11A, and a dark portion is formed at an outer peripheral portion of the irregular portion. That is, in some irregular portions, an area of the segment 4$d$' is too large to be covered with one light source 3'. As a result, a dark portion may be formed at the outer peripheral portion of the cutout portion 1$a$' and luminance may not be uniform.

In this regard, in the embodiment of FIGS. 7, 8, 9, and 10A, as illustrated in FIG. 10B, although the luminance is slightly high at the left side portion in the drawing where the light sources 3 are densely disposed, no dark portion is formed at the peripheral portion. The dark portion needs not to be corrected, but a bright portion can be corrected by an optical sheet or the like disposed at the emission surface side of the reflector 4. For example, performing a process of decreasing a light transmittance on a portion of an optical sheet corresponding to a portion to be a bright portion can decrease the luminance of the bright portion and improve the overall luminance uniformity. For example, adjusting the amount of light emission by adjusting a current to be applied to the light source 3 can decrease the luminance of the bright portion and improve the overall luminance uniformity. For example, disposing a black light absorbing member at part of the segment 4$d$ can decrease the luminance of the bright portion and also improve the overall luminance uniformity.

Third Embodiment

Figure 12A:
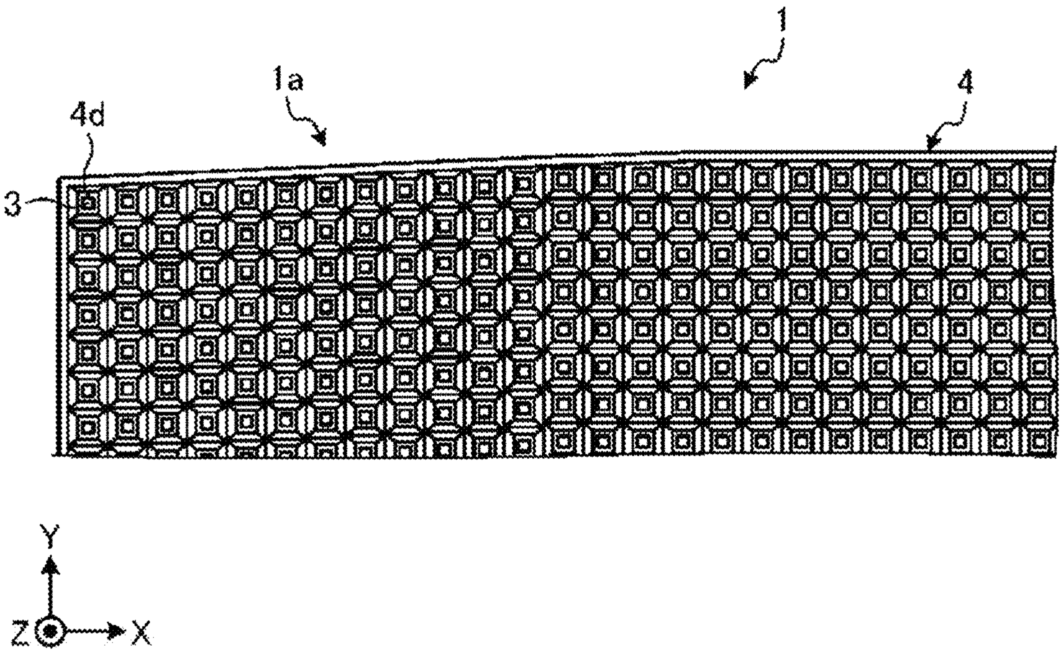
FIG. 12A is a plan view illustrating the vicinity of a cutout portion of a planar illumination device according to a third embodiment.

FIG. 12A is a plan view illustrating the vicinity of a cutout portion 1$a$ of a planar illumination device 1 according to a third embodiment. In FIG. 12A, segments 4$d$ disposed in a predetermined region (from the first row to about the fourth row from the top) including the cutout portion 1$a$ having an irregular outer shape are equalized in shape and size. The predetermined region to be equalized is changed in accordance with an aspect of the irregular shape and may be an entire surface or a localized surface. The equalization does not mean that shapes and sizes are exactly the same but that the shapes and sizes are adjusted to be approximated as much as possible. Specifically, for example, in FIG. 12A, the size from the side of the upper end of a reflector 4 including the cutout portion 1$a$ to the upper end of the lower fifth row excluding the width of an outer wall is divided into four equal parts, and segments 4$d$ corresponding to four rows are disposed in the four equal parts. The other configurations are the same as the configurations in FIGS. 7 to 9.

Figure 12B:
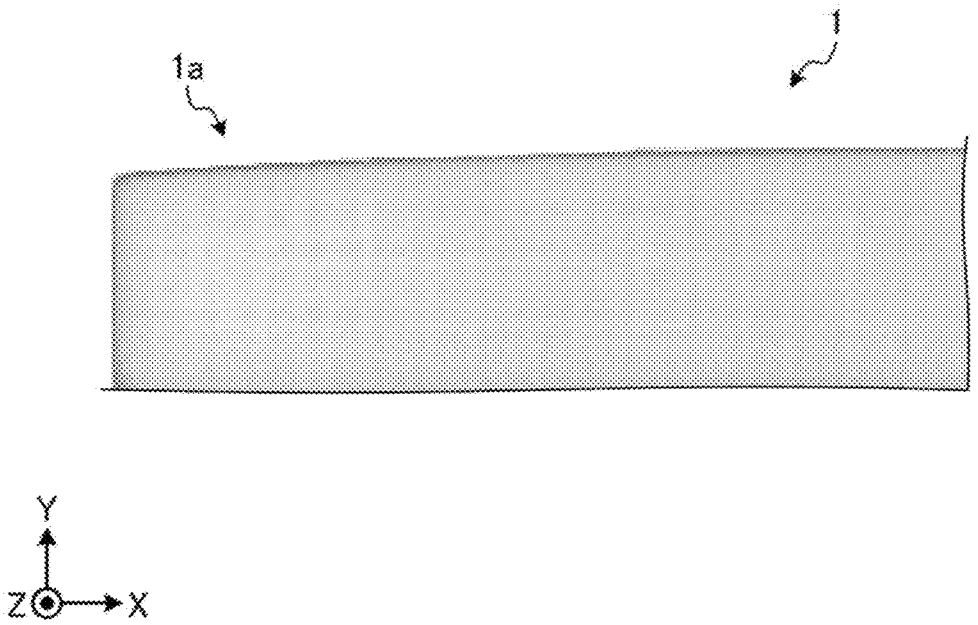
FIG. 12B is a view illustrating an example of a luminance distribution of the planar illumination device in FIG. 12A.

FIG. 12B is a view illustrating an example of a luminance distribution of the planar illumination device 1 in FIG. 12A, and the luminance uniformity in the vicinity of the cutout portion 1*a* is improved as compared with the first embodiment of FIG. 10B.

Fourth Embodiment

Figure 13:
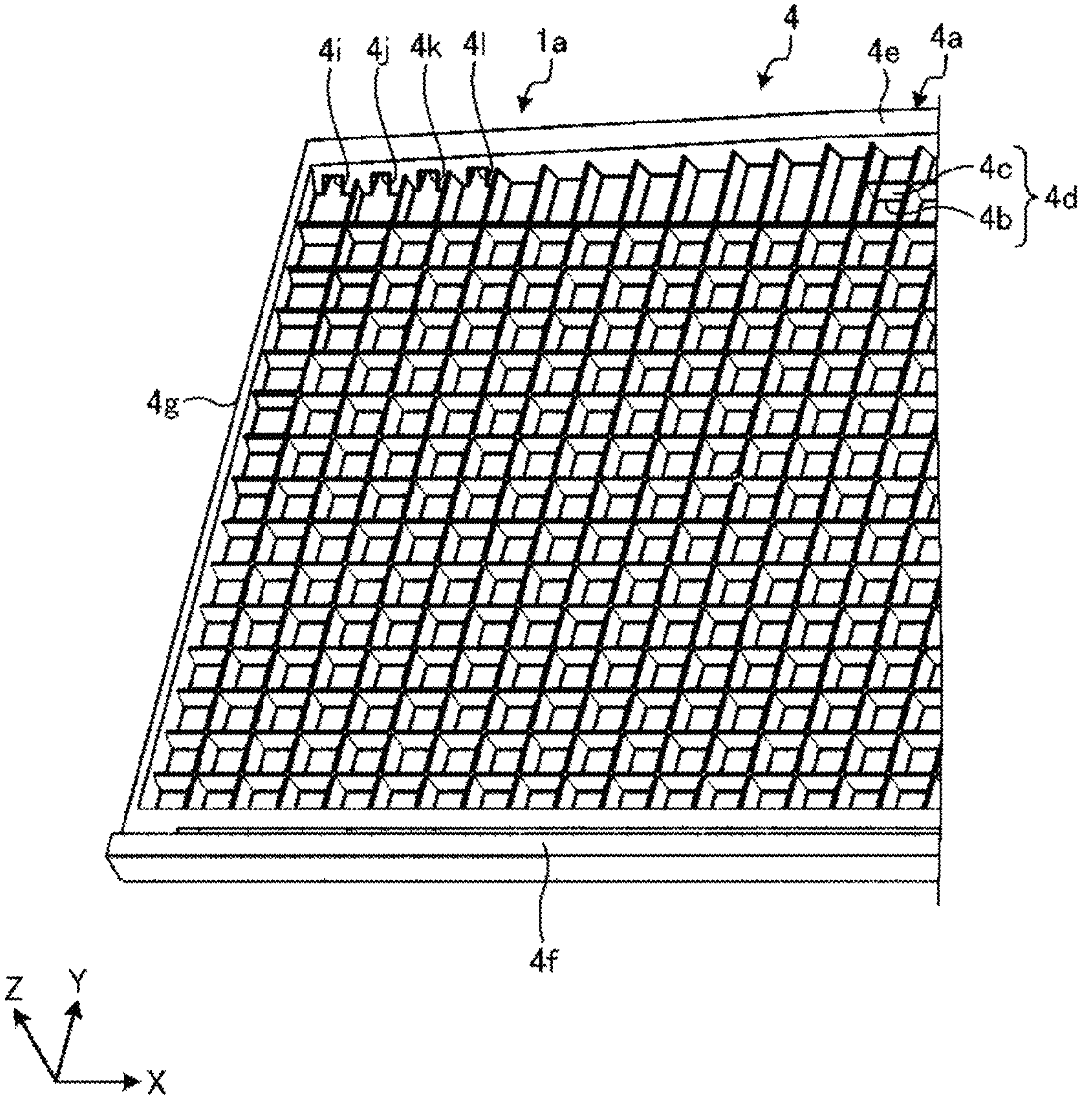
FIG. 13 is a perspective view illustrating the vicinity of a cutout portion of a planar illumination device according to a fourth embodiment.

FIG. 13 is a perspective view illustrating the vicinity of a cutout portion 1*a* of a planar illumination device 1 according to a fourth embodiment with improvements added to the second embodiment of FIG. 9. Similar improvements may also be made to the third embodiment of FIG. 12A.

In FIG. 13, in the vicinity of the cutout portion 1*a* of a reflector 4, recessed portions 4*i*, 4*j*, 4*k*, and 4*l* for accommodating light sources 3 or adjusting the amount of light of the light sources 3 are provided at the surface of an outer wall 4*e* opposing a substrate 2 (back surface in the drawing), as in the first embodiment. The recessed portions 4*i*, 4*j*, 4*k*, and 4*l* may or may not extend to an upper end part of the outer wall 4*e* in the drawing depending on the width of the outer wall 4*e*. The reflector 4 is made of, for example, a white resin or the like having a high reflectance; however, the recessed portions 4*i*, 4*j*, 4*k*, and 4*l* may be formed so that the material of the recessed portions 4*i*, 4*j*, 4*k*, and 4*l* may be exposed or the reflectance of the surfaces of the recessed portions 4*i*, 4*j*, 4*k*, and 4*l* may be changed by coloring or the like. The other configurations are the same as the configurations in FIGS. 7 to 9.

That is, when the size of a segment 4*d* is not sufficiently securable by the cutout portion 1*a*, a plurality of (two) light sources 3 may be difficult to be disposed; however, since light sources 3 can be disposed to be partially hidden below the recessed portions 4*i*, 4*j*, 4*k*, and 4*l*, a space for disposing the light sources 3 is easily secured. Disposing a plurality of (two) light sources 3 in a narrow segment 4*d* increases the amount of light per area to increase the luminance (as described above with reference to FIG. 10B); however, the outer wall 4*e* serves as a cover for the light sources 3 partially inserted and disposed in the recessed portions 4*i*, 4*j*, 4*k*, and 4*l* and blocks light emitted directly above to allow the amount of light to be suppressed, and thus the luminance can be prevented from increasing more than necessary. As a result, the luminance uniformity can be improved.

Fifth Embodiment

Figure 14:
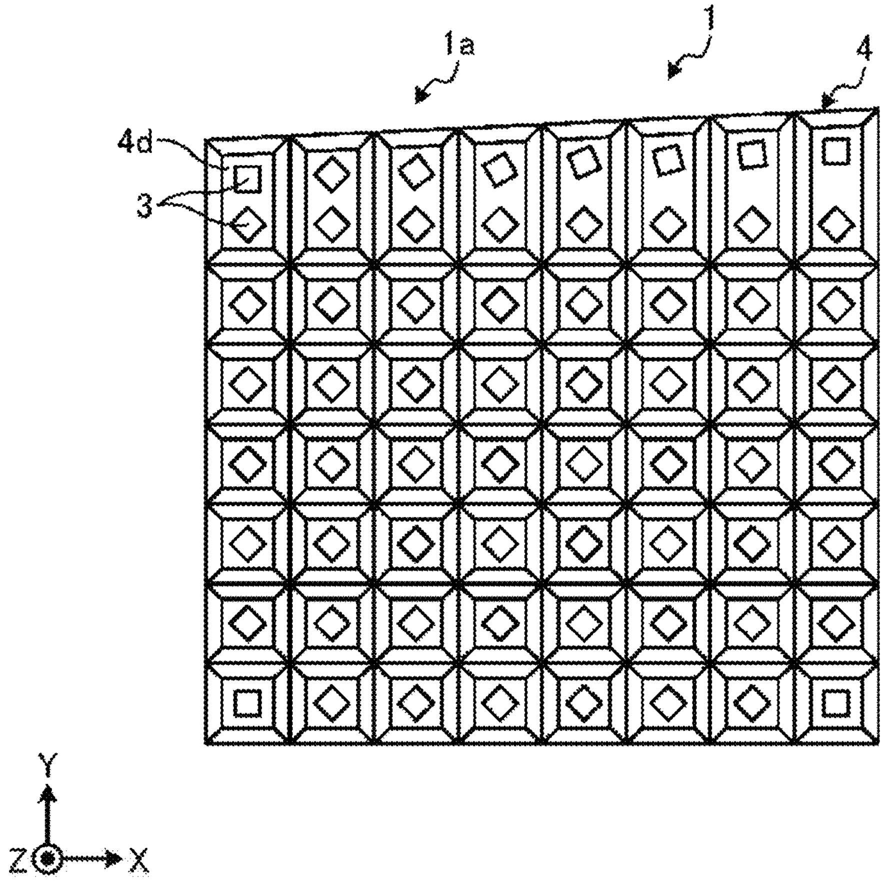
FIG. 14 is a plan view of a planar illumination device according to a fifth embodiment.

FIG. 14 is a plan view of a planar illumination device 1 according to a fifth embodiment. The illustration of the outer wall of the reflector 4 is omitted. As in FIGS. 7 and 8, a substrate 2 is provided on the back surface of the reflector 4, and light sources 3 are disposed on the substrate 2. Although the disclosure is applied to a case where a plurality of (two) light sources 3 is accommodated in a segment 4*d* at the side of the cutout portion 1*a* as in FIG. 10A, the disclosure can also be similarly applied to a case where one light source 3 is accommodated in an equalized segment 4*d* as in FIG. 12A.

In FIG. 14, a plurality of (two) light sources 3 is accommodated in a segment 4*d* of the first row at the side of the cutout portion 1*a* of the reflector 4, as in the second embodiment of FIG. 10A. Furthermore, light sources 3 at four corners of the entire reflector 4 are disposed with a rotation angle of 0° in a plane parallel to the reflector 4 and the substrate 2 while four sides around each light source 3 coincide with or are orthogonal to the X-axis or the Y-axis. Furthermore, the light source 3 disposed between corners at both ends in the segment 4*d* of the first row at the side of the cutout portion 1*a* has a rotation angle continuously changed from the right corner. The other light sources 3 are disposed at a rotation angle of 45°.

Figure 15A:
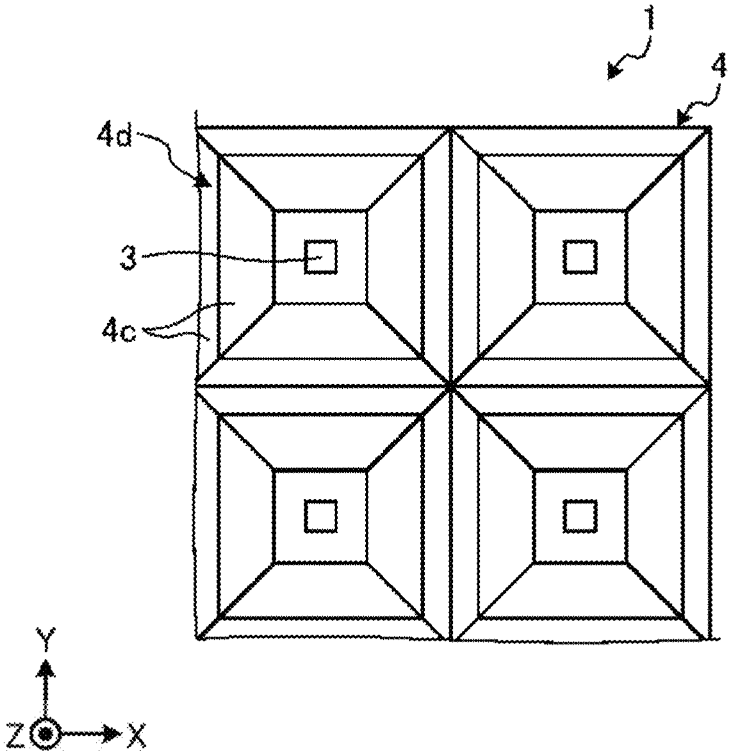
FIG. 15A is a plan view illustrating an example when a rotation angle of a light source of the planar illumination device in a plane is 0°.
Figure 15B:
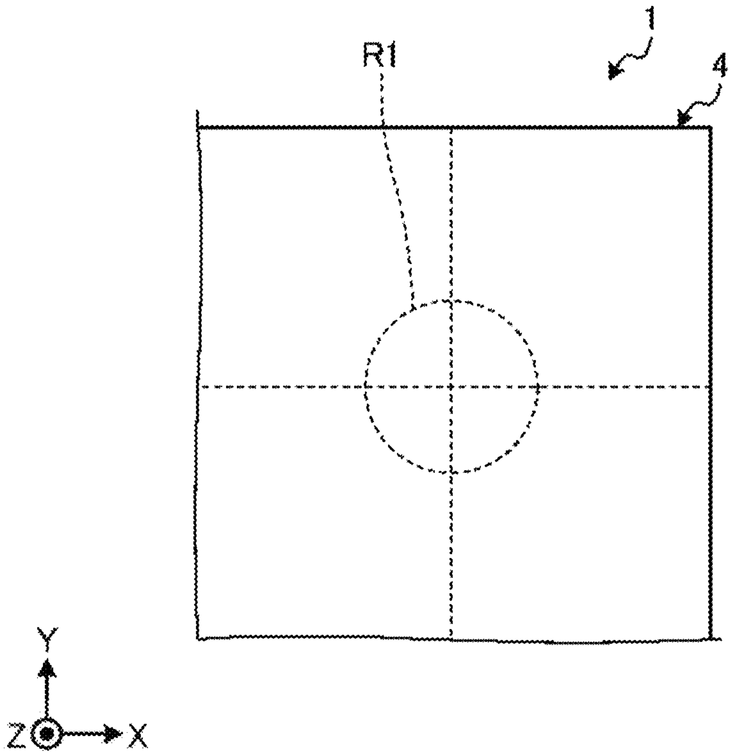
FIG. 15B is a view illustrating characteristics of a luminance distribution in the arrangement of FIG. 15A.

FIG. 15A is a plan view illustrating an example when the rotation angle of the light source 3 of the planar illumination device 1 in the plane is 0°. The illustration of the outer wall of the reflector 4 is omitted. The light source 3 has a substantially cubic (or substantially rectangular parallelepiped) package outer shape, and mainly emits light from four side surfaces provided with phosphors. Therefore, the light-emitting direction has anisotropy, and the amount of light in the front direction of each of the four side surfaces increases. In FIG. 15A, since the rotation angle of the light sources 3 in the plane is 0°, the amount of light in the X-axis direction and the Y-axis direction increases. Since the reflecting surface 4*c* of the segment 4*d* is constituted by a plurality of planes divided by diagonal lines in the illustrated example, reflection is also anisotropic. As a result, light is likely to gather at the corners of each segment 4*d*, and the luminance of the corners increases. FIG. 15B is a view illustrating characteristics of a luminance distribution in the arrangement of FIG. 15A, and the luminance of a region R1 where the corners of four segments R1 gather becomes high, causing non-uniform luminance.

Figure 16A:
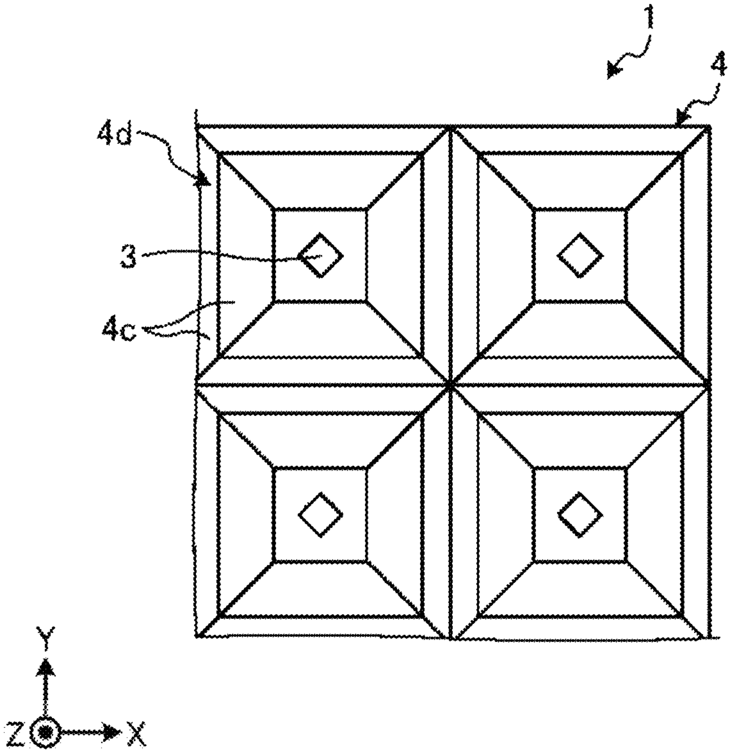
FIG. 16A is a plan view illustrating an example when the rotation angle of the light source of the planar illumination device in the plane is 45°.
Figure 16B:
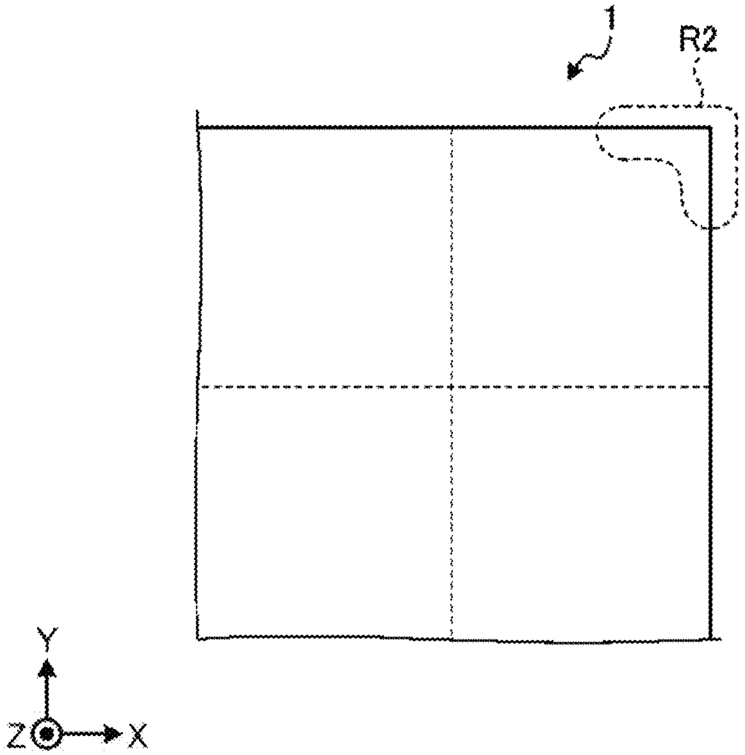
FIG. 16B is a view illustrating characteristics of a luminance distribution in the arrangement of FIG. 16A.

On the other hand, FIG. 16A is a plan view illustrating an example when the rotation angle of the light source 3 of the planar illumination device 1 in the plane is 45°. The illustration of the outer wall of the reflector 4 is omitted. FIG. 16B is a view illustrating characteristics of a luminance distribution in the arrangement of FIG. 16A, and since the relative rotation angle between the light source 3 and the reflecting surface 4*c* is changed by 45°, the luminance of a portion where the corners of four segments 4*d* gather becomes low. However, the luminance of a region R2 of a corner of the whole is decreased, causing non-uniform luminance. This is because the corner portion of the whole includes no segments adjacent in two directions, and thus the luminance is originally likely to be low. In this regard, in the arrangement of FIG. 15A, a decrease in luminance is alleviated because the corners of each segment 4*d* become bright, but in the arrangement of FIG. 16A, a decrease in luminance becomes remarkable because the decrease in luminance is not alleviated.

For these reasons, to suppress a decrease in luminance at the whole corner, the planar illumination device 1 of FIG. 14 has the rotation angle of the light source 3 at the corner portion of the whole of 0°. The rotation angle of the light sources 3 is set to 45° except for the side of the cutout portion 1*a* so that the luminance of a portion where the corners of four segments 4*d* gather does not become high. As for the light sources 3 disposed in the segment 4*d* except for the corner portions of the whole, both ends at the side of the cutout portion 1*a*, the rotation angle is continuously changed from the light sources 3 at the right end. This is because an area of the segment 4*d* is larger at the right side than at the left side and the relative amount of light at the right side is smaller, so the brightness of the corners of the segment 4*d* needs to be secured toward the right side.

Sixth Embodiment

The change in the rotation angle of the light source 3 in the plane can also be applied to a case including no irregular portion such as the cutout portion 1*a*.

Figure 17:
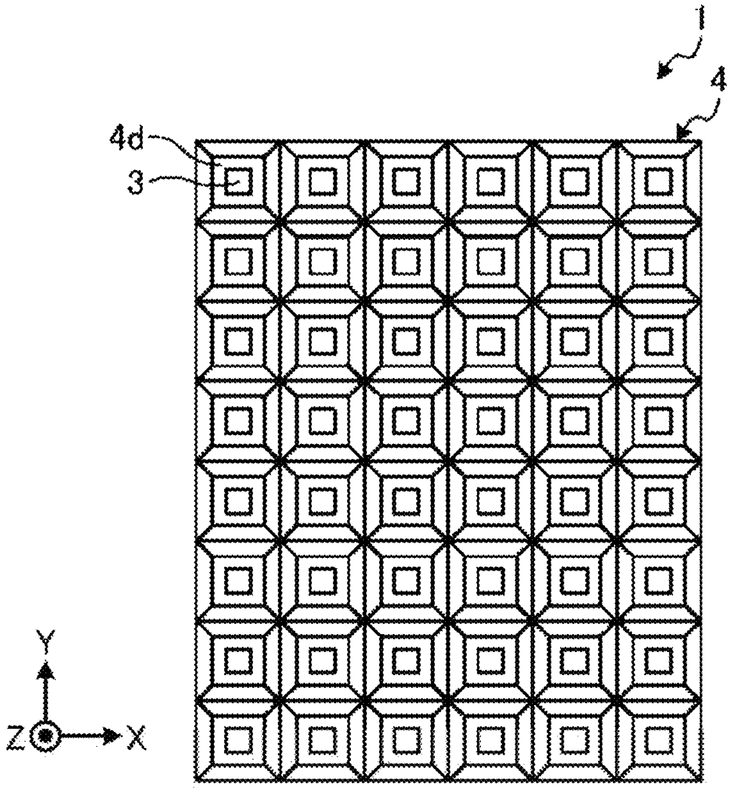
FIG. 17 is a plan view illustrating an example when rotation angles of all light sources of the planar illumination device in a plane are 0°.

FIG. 17 is a plan view illustrating an example when rotation angles of all light sources 3 of a planar illumination device 1 in a plane are 0°. The illustration of the outer wall of the reflector 4 is omitted. In this case, as described with reference to FIGS. 15A and 15B, a decrease in the luminance at the corner portion of the whole is alleviated to some extent, but the luminance at a portion where the corners of four inner segment 4*d* gather becomes high and the luminance uniformity decreases.

Figure 18:
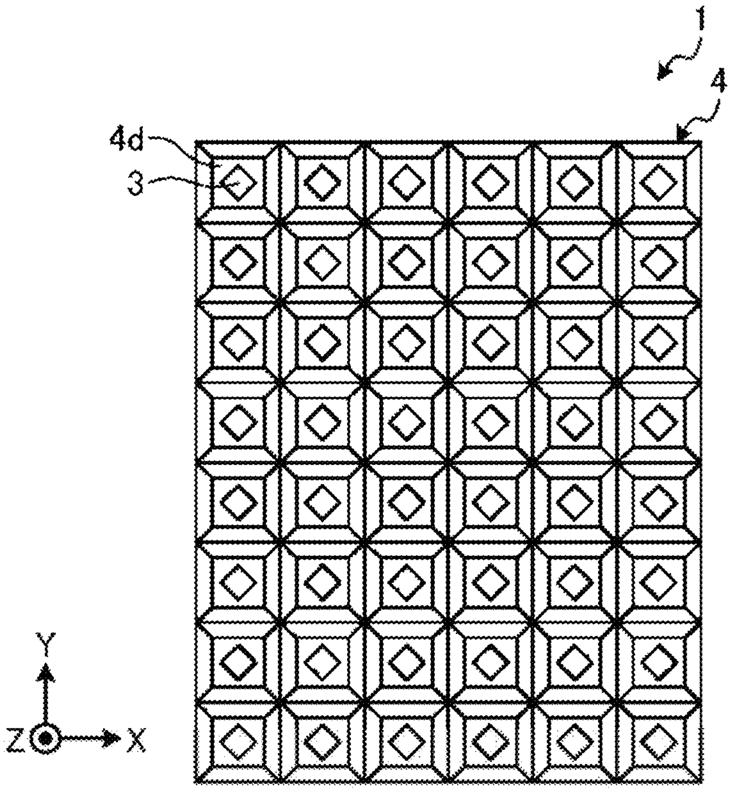
FIG. 18 is a plan view illustrating an example when the rotation angles of all the light sources of the planar illumination device in the plane are 45°.

FIG. 18 is a plan view illustrating an example when the rotation angles of all the light sources 3 of the planar illumination device 1 in the plane are 45°. The illustration of the outer wall of the reflector 4 is omitted. In this case, as described with reference to FIG. 16A and FIG. 16B, an increase in the luminance of a portion where the corner portions of four inner segments 4*d* gather is suppressed, but a decrease in the luminance of the corner portion of the whole becomes significant and the luminance uniformity decreases.

Figure 19:
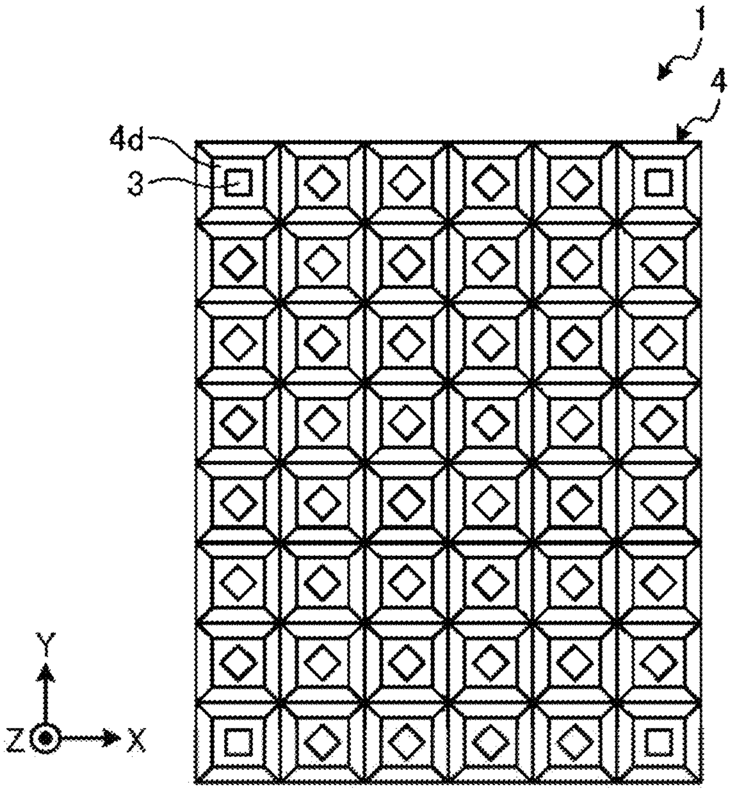
FIG. 19 is a plan view illustrating an example when the rotation angles of light sources at corner portions of the whole planar illumination device in the plane are 0° and the rotation angles of the other light sources in the plane are 45°.

FIG. 19 is a plan view illustrating an example when the rotation angles of the light sources 3 at the corner portion of the whole of the planar illumination device 1 in the plane are 0° and the rotation angles of the other light sources 3 in the plane are 45°. The illustration of the outer wall of the reflector 4 is omitted. In this case, a decrease in luminance at the corner portion of the whole is alleviated to some extent, and an increase in luminance at a portion where four inner segments 4*d* gather is suppressed.

Seventh Embodiment

The pattern of the shape of a reflecting surface 4*c* of a segment 4*d* of a reflector 4 is described below. Although the rotation angle of a light source 3 in a plane is set to 0° in the following drawings, the rotation angle of the light source 3 can be changed on the basis of the principle described above.

Figure 20:
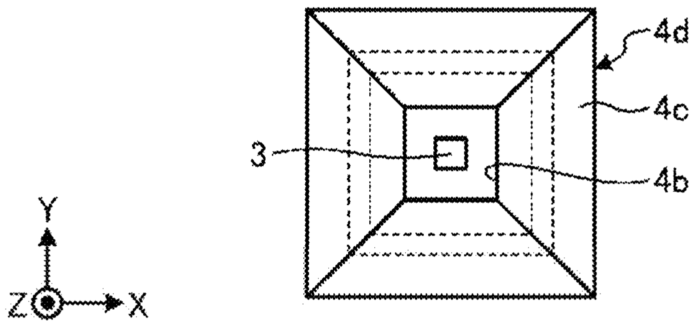
FIG. 20 is a plan view (1) illustrating an example of the shape of a reflecting surface of a segment of the reflector.

FIG. 20 is a plan view illustrating an example of the shape of the reflecting surface 4*c* of the segment 4*d* of the reflector 4, and illustrates a case where the reflecting surface 4*c* is constituted by a plurality of planes divided by diagonal lines of the segment 4*d* having a rectangular shape, as described above. Broken lines in the drawing indicate contour lines of the shape.

Figure 21:
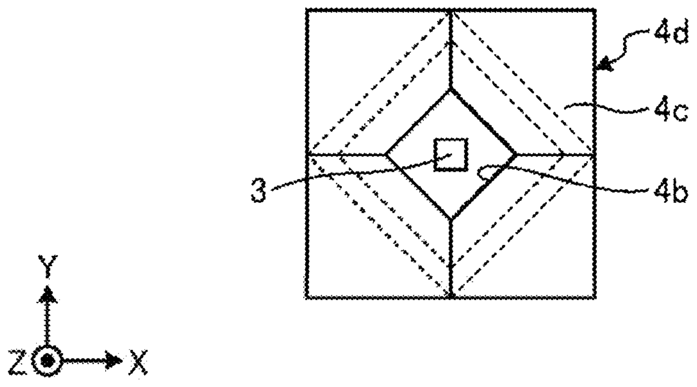
FIG. 21 is a plan view (2) illustrating an example of the shape of the reflecting surface of the segment of the reflector.

FIG. 21 is a plan view illustrating another example of the shape of the reflecting surface 4*c* of the segment 4*d* of the reflector 4, and illustrates a case where the reflecting surface 4*c* is constituted by a plurality of planes divided by vertical and horizontal cross lines. In this case, the relative rotation angle between the anisotropy of the light source 3 and the anisotropy of the segment 4*d* is the same as in FIG. 16A, and the effects are also the same.

Figure 22:
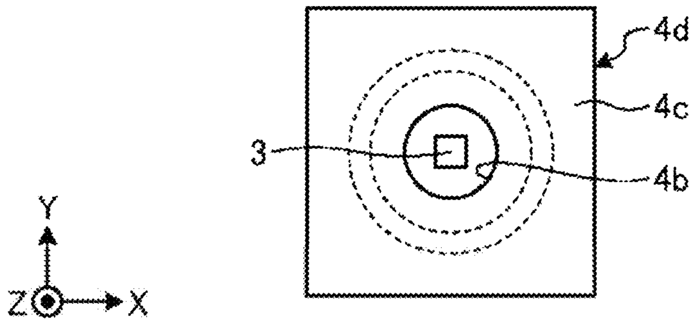
FIG. 22 is a plan view (3) illustrating an example of the shape of the reflecting surface of the segment of the reflector.

FIG. 22 is a plan view illustrating another example of the shape of the reflecting surface 4*c* of the segment 4*d* of the reflector 4, and illustrates a case where the reflecting surface 4*c* is constituted by a conical curved surface. In this case, the anisotropy of the segment 4*d* is eliminated or reduced, and only the anisotropy of the light source 3 remains.

Figure 23:
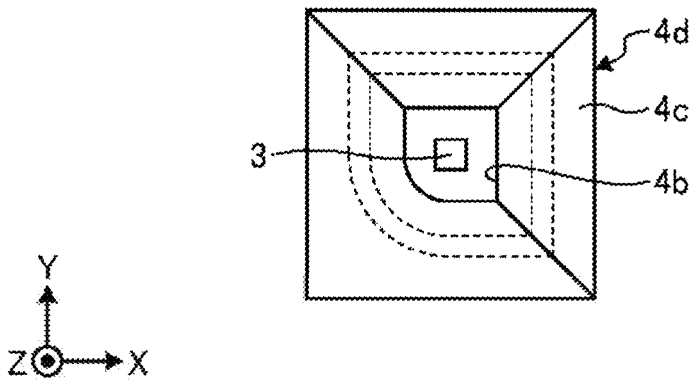
FIG. 23 is a plan view (4) illustrating an example of the shape of the reflecting surface of the segment of the reflector.

FIG. 23 is a plan view illustrating another example of the shape of the reflecting surface 4*c* of the segment 4*d* of the reflector 4, and illustrates a case where one region partitioned by one diagonal line is constituted by a plurality of planes divided by other diagonal lines and the other region is constituted by a conical curved surface to constitute the reflecting surface 4*c*. In this case, the anisotropy of the segment 4*d* is eliminated or reduced in the other region, and only the anisotropy of the light source 3 remains.

By combining the shape patterns of the reflecting surfaces 4*c* in FIGS. 20 to 23 described above and the rotation angle of the light sources 3 in the plane, the luminance can be variously changed.

The embodiments of the disclosure have been described above, but the disclosure is not limited to the embodiments described above, and various modifications are possible without departing from the spirit of the disclosure.

As described above, the planar illumination device according to the embodiment includes a plurality of light sources, a substrate with the light sources bidimensionally disposed and a reflector provided with a segment including a hole corresponding to each of the light sources and a reflecting surface extending obliquely from a periphery of the hole, provided with outer walls at an entire outer peripheral portion of the reflector, the reflector being disposed at an emission side of the substrate. In the segment disposed at an irregular portion of an outer peripheral portion of the reflector and unconfigurable into a predetermined shape by the outer walls, surfaces of the outer walls opposing the substrate are provided with recessed portions for accommodating the light sources or adjusting an amount of light. This allows a dark portion to be less likely to be formed even when the planar illumination device has an irregular outer shape.

The recessed portions are provided through the outer wall. This can provide, even when the thickness of the outer wall is not sufficient, a recessed portion having an adequate width sufficient to accommodate the light source.

The recessed portions are provided without extending through the outer wall. This can cope with a sufficient thickness of the outer wall and prevent a decrease in the strength of the reflector.

The light source has a substantially rectangular outer shape in a plan view, the predetermined shape of the segment is substantially rectangular in a plan view, the hole in the predetermined shape of the segment has a substantially rectangular outer shape in the plan view, and the reflecting surface in the predetermined shape of the segment is constituted by a plurality of planes. This can embody the structure of the planar illumination device.

A segment group for improving uniformity disposed at the irregular portion of the outer peripheral portion of the reflector is provided. This can maintain, even when the planar illumination device has an irregular outer shape, luminance uniformity.

In the segment group, a segment having an irregular shape and a segment adjacent to the segment are integrated by removing a partition at a boundary between the two segments. This can constitute a segment suitable for an irregular portion. This can also increase a space for accommodating the light source.

Provided are a plurality of light sources, a substrate with the light sources bidimensionally disposed, a reflector provided with a segment including a hole corresponding to each of the light sources and a reflecting surface extending obliquely from a periphery of the hole, the reflector being disposed at an emission side of the substrate, and a segment group for improving uniformity disposed at an irregular portion of an outer peripheral portion of the reflector. This can maintain, even when the planar illumination device has an irregular outer shape, luminance uniformity.

In the segment group, a segment having an irregular shape and a segment adjacent to the segment are integrated by removing a partition at a boundary between the two segments. This can constitute a segment suitable for an irregular portion. Furthermore, a space for accommodating the light source can be increased.

Moreover, the disclosure is not limited to the embodiments described above. A configuration obtained by appropriately combining the above-mentioned constituent elements is also included in the disclosure. Further effects and modified examples can be easily derived by a person skilled in the art. Thus, a wide range of aspects of the disclosure are not limited to the embodiments described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device, comprising:

a plurality of light sources;

a substrate with the plurality of light sources bidimensionally disposed thereupon; and a reflector provided with a plurality of segments, each of the plurality of segments including a hole corresponding to a respective light source of the plurality of light sources and a reflecting surface extending obliquely from a periphery of the hole, the reflector being provided with outer walls at an entire outer peripheral portion of the reflector, the reflector being disposed at an emission side of the substrate, wherein:

each hole is formed in a center of the respective segment in a plan view, each light source of the plurality of light sources is inserted in the respective hole, the reflector has a section that has an irregular portion, which thereby makes the reflector shape not perfectly rectangular, one or a plurality of recesses is provided at an outer wall of a segment disposed in the section for accommodating-the light sources or adjusting an amount of light.

2. The planar illumination device according to claim 1, wherein each of the recesses is provided through the outer wall.

3. The planar illumination device according to claim 1, wherein each of the recesses is located within the outer wall.

4. The planar illumination device according to claim 1, wherein the light sources each have a substantially rectangular outer shape in a plan view, the predetermined shape of the segment is substantially rectangular in a plan view, the hole in the predetermined shape of the segment has a substantially rectangular outer shape in a plan view, and the reflecting surface in the predetermined shape of the segment is constituted by a plurality of planes.

5. The planar illumination device according to claim 1, comprising a plurality of segments for improving uniformity disposed at the irregular portion of the outer peripheral portion of the reflector, the plurality of segments comprising a first segment having an irregular shape and a second segment adjacent to the first segment.

6. The planar illumination device according to claim 1, wherein a height of the outer wall in the optical axis direction is larger than a height of the light sources in the optical axis direction.

7. The planar illumination device according to claim 1, wherein a width of the outer wall in a side direction is an adequate width sufficient to partially accommodate light sources.

8. The planar illumination device according to claim 1, wherein each of the outer wall with the recesses covers a part of the light source disposed in each of the recesses in a side direction.

9. The planar illumination device according to claim 1, wherein the outer wall with each of the covers a part of the light source disposed in each of the recesses in the optical axis direction.

10. The planar illumination device according to claim 1, wherein at least part of one of the light sources is disposed to be partially hidden below each of the recesses from a top view.

11. The planar illumination device according to claim 1, wherein at least one of the light sources is disposed partially in each of the recesses.

12. The planar illumination device according to claim 1, wherein a segment not being disposed at the irregular portion of the outer peripheral portion of the reflector has a substantially rectangular outer shape in a plan view and does not include a recess.

13. The planar illumination device according to claim 1, wherein a segment not being disposed at the irregular portion of the outer peripheral portion of the reflector has a substantially rectangular outer shape in a plan view, and is configured to accommodate only one light source.

14. The planar illumination device according to claim 1, wherein in the segment disposed at the irregular portion, the outer wall is configured to prevent an arrangement of a light source.

15. The planar illumination device according to claim 1, wherein in the segment disposed at the irregular portion, a center of the segment is covered by the outer wall in a plan view.

16. The planar illumination device according to claim 5, wherein in the plurality of segments, the first segment and the second segment are integrated by removing a partition at a boundary between the two segments.

* * * * *